(12) United States Patent
Huber et al.

(10) Patent No.: US 11,919,727 B2
(45) Date of Patent: Mar. 5, 2024

(54) STACKING DEVICE, AUTOMATION MODULE AND METHOD

(71) Applicant: CHIRON Group SE, Tuttlingen (DE)

(72) Inventors: Sebastian Huber, Wurmlingen (DE); Markus Kohler, Immendingen (DE)

(73) Assignee: CHIRON Group SE, Tuttlingen (DE)

( * ) Notice: Subject to any disclaimer, the term of this patent is extended or adjusted under 35 U.S.C. 154(b) by 0 days.

(21) Appl. No.: 17/894,721

(22) Filed: Aug. 24, 2022

(65) Prior Publication Data

US 2023/0065489 A1 Mar. 2, 2023

(30) Foreign Application Priority Data

Aug. 30, 2021 (DE) ..................... 10 2021 122 406.3

(51) Int. Cl.
*B23Q 7/04* (2006.01)
*B23P 19/00* (2006.01)
(Continued)

(52) U.S. Cl.
CPC .......... *B65G 63/004* (2013.01); *B23P 19/001* (2013.01); *B23Q 7/046* (2013.01); *B65G 61/00* (2013.01); *B65G 63/00* (2013.01)

(58) Field of Classification Search
CPC ........ B23Q 7/046; B23Q 7/1431; B23Q 1/66; B23Q 7/04; B65G 61/00; B23P 19/001
See application file for complete search history.

(56) References Cited

U.S. PATENT DOCUMENTS 4,557,656 A * 12/1985 Ouellette ............... B65G 59/00
  414/928
4,588,341 A   5/1986 Motoda
(Continued)

FOREIGN PATENT DOCUMENTS

CN    2319384 Y   5/1999
DE    3424988 A1  1/1985
(Continued)

OTHER PUBLICATIONS

German Office Action for corresponding German Application No. 10 2021 122 406.3, dated Aug. 2, 2022.
(Continued)

*Primary Examiner* — Gregory W Adams
(74) *Attorney, Agent, or Firm* — Jason H. Vick; Sheridan Ross, PC

(57) ABSTRACT

A stacking device for handling loading aids for the automated feeding of a machine tool has a base, a stud frame that is held by the base and that supports a first vertical guide and a second vertical guide, and a first side and a second side. The first side has a vertically movable support segment for receiving a conveyor that carries two or more loading aids that are arranged one above the other. The support segment is moveable along the first vertical guide. The second side has a vertically movable lifting console for receiving at least one loading aid. The lifting console is configured to receive two or more loading aids arranged one above the other. The lifting console is moveable along the second vertical guide. The support segment and the lifting console are arranged facing away from each other at the stud frame. The support segment and the lifting console are coupled to each other in a forced coupling via a common coupling member and vertically movable in opposite directions via a common vertical drive. An automation module includes a stacking device and a handling unit. A method for feeding a machine tool uses such a stacking device.

25 Claims, 7 Drawing Sheets

(51) Int. Cl.
    *B65G 61/00*     (2006.01)
    *B65G 63/00*     (2006.01)

(56) References Cited

U.S. PATENT DOCUMENTS

| | | | | |
|---|---|---|---|---|
| 5,096,369 | A | * | 3/1992 | Ouellette .............. B65G 60/00 414/796.4 |
| 5,190,434 | A | * | 3/1993 | Miura ................... B65G 65/00 414/416.11 |
| 5,470,193 | A | * | 11/1995 | Miura ................. B23Q 7/1447 414/331.04 |
| 5,498,122 | A | * | 3/1996 | Miura ................. B23P 19/001 414/924 |
| 5,536,137 | A | | 7/1996 | Jäger |
| 5,882,174 | A | * | 3/1999 | Woerner ............... B65G 65/00 414/795.8 |
| 6,152,678 | A | * | 11/2000 | King ....................... B23Q 7/10 414/749.5 |
| 6,394,744 | B1 | * | 5/2002 | Price ..................... B65G 60/00 414/792.9 |
| 8,814,492 | B2 | | 8/2014 | Perl |
| 2008/0170934 | A1 | | 7/2008 | Labadie |

FOREIGN PATENT DOCUMENTS

| | | |
|---|---|---|
| DE | 29812106 U1 | 10/1998 |
| DE | 102007022908 A1 | 11/2008 |
| EP | 0673711 A1 | 9/1995 |
| EP | 1645529 A1 | 4/2006 |
| JP | 2004-175517 A | 6/2004 |
| WO | WO 2005/026023 A1 | 3/2005 |
| WO | WO 2006/042502 A1 | 4/2006 |

OTHER PUBLICATIONS

Extended European Search Report for corresponding European Patent Application No. 22192309.7, dated Jan. 30, 2023.
U.S. Appl. No. 18/389,442, filed Nov. 15, 2023, Huber et al.

* cited by examiner

STACKING DEVICE, AUTOMATION MODULE AND METHOD

CROSS-REFERENCE TO RELATED APPLICATIONS

This application claims priority to German patent application 10 2021 122 406.3, filed on Aug. 30, 2021. The entire content of this priority application is incorporated herein by reference.

BACKGROUND

The present disclosure relates to a stacking device for handling loading aids for the automated feeding of a machine tool, for instance for an automated workpiece change, comprising a base, a stud frame supported by the base and carrying at least one vertical guide, a first side with a vertically movable support segment for receiving a conveyor, which carries two or more loading aids arranged one above the other, and a second side with a vertically movable lifting console for receiving at least one loading aid, wherein the lifting console is configured to carry two or more loading aids arranged one above the other.

The present disclosure further relates to an automation module and a manufacturing system including such a stacking device. Eventually, the present disclosure relates to a method of feeding a machine tool.

US 2008/0170934 A1 discloses a device for handling crates and the like, comprising a platform with a first lateral stanchion having a guide for receiving a first carrier and a second lateral stanchion having a guide for receiving a second carrier, wherein the device is adapted to move the two carriers synchronously, so that one carrier is lifted when the other carrier is lowered. In this way, crates can be transferred between a first stack on a first carriage on the first lateral stanchion and a second stack on a second carriage. on the second lateral stanchion U.S. Pat. No. 4,588,341 A discloses a stacking device for providing goods on loading aids, wherein the stacking device comprises a carrier for a first stack and a carrier for a second stack, which can be lifted and lowered independently of each other, and wherein handling technology is provided to transfer loading aids between the first stack and the second stack.

A palletizer is known from U.S. Pat. No. 8,814,492 B2, which has a rotary table with a rotary column, the rotary column having two vertically movable cantilevers, which are mounted on the rotary column and offset by 180°. The cantilevers each have an own lifting drive.

A handling system for feeding workpieces to a downstream processing device is known from U.S. Pat. No. 5,536,137 A, wherein the handling system has a rotary table for transferring workpiece carrier stacks that are arranged on roller carriages together with the roller carriages, wherein a transfer device is connected to the rotary table, which transfers workpiece carriers between the rotary table and a waiting position or a supply position, and wherein a loading device with gantry loader is provided, which transfers workpiece carriers between the supply position and the processing device.

From U.S. Pat. No. 6,152,678 A, a device for the mechanical handling of pallets is known, which has a first pallet lift and a second pallet lift that are facing away from each other, wherein a transfer unit for transferring pallets between the first pallet lift and the second pallet lift is arranged above the first pallet lift and the second pallet lift. The pallet lifts are vertically movable independently of each other.

Stacking devices can be coupled with other handling devices to perform or support an at least partially automated workpiece change (also referred to as loading) on a machine tool.

By way of example, a conveyor (for example, floor conveyors in the form of a pallet trolley or the like) can be fed to the first side, the conveyor carrying a stack of two or more loading aids arranged one above the other. The loading aids are, for example, pallets, so-called Euro containers, trays, small load carriers or the like. The loading aids typically carry or accommodate a plurality or variety of workpieces. In certain embodiments, the loading aids are configured to accommodate both workpieces before machining in the machine tool and workpieces after machining in the machine tool.

Stacking devices are usually configured to form stacks of loading aids arranged on top of each other (stacking) or to break them up (unstacking). In the field of machine tools, this often serves as a preparatory measure for the actual separation of workpieces accommodated by the loading aids. Separation involves the removal or deposition of individual workpieces, usually with a further handling device, such as a handling robot. Accordingly, stacking devices can also serve as storage or intermediate storage (buffer) for workpieces if a corresponding number of loading aids with a plurality of workpieces are provided.

In view of this, it is an object of the present disclosure to present a productive stacking device. A further object is to present a corresponding method. A further object is to present a method that makes us of the stacking device.

It is a further object of the present disclosure to present a stacking device that is compact in design and that can be implemented with relatively little effort.

It is a further object of the present disclosure to present a stacking device that is suitable for a combination with a handling unit that takes individual workpieces from the loading aid of the stacking device or delivers them thereto.

It is a further object of the present disclosure to present a stacking device that can be used as a storage unit or buffer to enable semi-automated or highly automated processing of a plurality or variety of workpieces.

It is a further object of the present disclosure to present an automation module that is provided with such a stacking device, a manufacturing system and a corresponding method for feeding a machine tool.

SUMMARY

According to a first aspect, these and other objects are achieved by a stacking device for handling loading aids for an automated feeding of a machine tool, comprising:
  a base,
  a first side having a first vertical guide,
  a second side having a second vertical guide,
  a stud frame supported by the base,
  a vertically movable support segment that is moveable along the first vertical guide, and
  a vertically movable lifting console that is moveable along the second vertical guide,
  wherein the first vertical guide and the second vertical guide are mounted at the stud frame, wherein the support segment is disposed on the first side and configured for receiving a conveyor that carries two or more loading aids that are arranged one above the other, wherein the lifting console is disposed on the second side and configured for receiving one or more loading aids and for supporting two or more loading aids that are arranged one above the other, wherein the support segment and the lifting console are arranged facing away from each other at the stud frame, and wherein the support segment and the lifting console are coupled to one another in a forced coupling via a common coupling member, and are together vertically movable at the stud frame in opposite directions via a common vertical drive.

According to another aspect, the above and other objects are achieved by an automation module for an automated feeding of a machine tool, comprising:

a stacking device for handling loading aids, comprising
a base,
a first side having a first vertical guide,
a second side having a second vertical guide,
a stud frame supported by the base,
a vertically movable support segment that is moveable along the first vertical guide, and
a vertically movable lifting console that is moveable along the second vertical guide,
wherein the first vertical guide and the second vertical guide are mounted at the stud frame,
wherein the support segment is disposed on the first side and configured for receiving a conveyor that carries two or more loading aids that are arranged one above the other,
wherein the lifting console is disposed on the second side and configured for receiving one or more loading aids and for supporting two or more loading aids that are arranged one above the other,
wherein the support segment and the lifting console are arranged facing away from each other at the stud frame, and
wherein the support segment and the lifting console are coupled to one another in a forced coupling via a common coupling member, and are together vertically movable at the stud frame in opposite directions via a common vertical drive, and
a handling unit that is arranged to transfer workpieces between a loading aid provided by the stacking device on the second side and a machine tool.

According to another aspect, the above and other objects are achieved by a method for feeding a machine tool, comprising the following steps:

providing a stacking device for handling loading aids, comprising
a base,
a first side having a first vertical guide,
a second side having a second vertical guide,
a stud frame supported by the base,
a vertically movable support segment that is moveable along the first vertical guide,
a vertically movable lifting console that is moveable along the second vertical guide, and
a transfer unit that is configured to transfer a loading aid between the first side and the second side,
wherein the first vertical guide and the second vertical guide are mounted at the stud frame, wherein the support segment is disposed on the first side and configured for receiving a conveyor that carries two or more loading aids that are arranged one above the other, wherein the lifting console is disposed on the second side and configured for receiving one or more loading aids and for supporting two or more loading aids that are arranged one above the other, wherein the support segment and the lifting console are arranged facing away from each other at the stud frame, and wherein the support segment and the lifting console are coupled to one another in a forced coupling via a common coupling member, and are together vertically movable at the stud frame in opposite directions via a common vertical drive, feeding a conveyor carrying a stack of at least two loading aids that are arranged one above the other to the first side, taking up the conveyor with the loading aids by the support segment, vertically moving the support segment so that an upper loading aid can be gripped by the transfer unit, gripping the upper loading aid by the transfer unit, horizontally moving the loading aid with the transfer unit from the first side to the second side, and vertically moving the lifting console in such a way that the loading aid can be deposited as an upper loading aid by the transfer unit on the lifting console or on a loading aid already provided there, wherein the vertical movement of the support segment and the vertical movement of the lifting console involves a forced coupling and a pilgrim step characteristic.

According to another aspect, the above and other objects are achieved by a stacking device for handling loading aids for the automated feeding of a machine tool, for instance for an automated workpiece change, comprising:

a base,
a stud frame supported by the base and carrying at least one first vertical guide and at least one second vertical guide,
a first side having a vertically movable support segment for receiving a conveyor carrying two or more loading aids arranged one above the other, wherein the first vertical guide is assigned to the first side, and wherein the support segment is moveable along the first vertical guide, and
a second side having a vertically movable lifting console for receiving at least one loading aid,
wherein the lifting console is configured to support two or more loading aids that are arranged one above the other, wherein the second vertical guide is assigned to the second side, and wherein the lifting console is moveable along the second vertical guide,
wherein the support segment and the lifting console are arranged facing away from each other at the stud frame, and
wherein the support segment and the lifting console are coupled to one another in a forced coupling via a common coupling member and vertically movable in opposite directions at the stud frame via a common vertical drive.

In certain embodiments, the support segment and the lifting console are mechanically coupled to each other, for instance force-coupled, and can be moved vertically. This enables the use of a common vertical drive, which for example has a (single) motor or another actuator. In this way, the required installation space can be reduced. The vertical drive can be arranged in such a way as to provide good accessibility.

The first side can also be referred to as the loading side. For example, the first side provides an interface to the outside (to the environment). The first side is accessible to conveyors. Conveyors, for instance floor conveyors, can be handled at the first side, comprising coupling or uncoupling of conveyors with loading aids and loads (usually workpieces) arranged therein.

In functional terms, the first side can therefore be referred to as the outside. In functional terms, the second side can be referred to as the inside. The second side also provides an interface, which is functionally oriented towards the machine tool. The second side can also be referred to as the handling side, or as the robot side if a handling robot is used. On the second side, individual workpieces are usually separated or brought together in relation to loading aids.

In an exemplary embodiment, the support segment is configured to engage underneath the conveyor in order to be able to lift the conveyor.

The conveyor is, for example, a floor conveyor. A floor conveyor can be configured as a floor conveyor trolley, by way of example. The conveyor can be a driven conveyor or a drive-less conveyor. The conveyor is configured to carry a stack of loading aids arranged one above the other. Loading aids are, for example, pallets, trays, Euro containers and the like. Loading aids accommodate workpieces and facilitate handling and transfer of the workpieces. Loading aids can be configured to accommodate a variety of workpieces. The workpieces may be arranged loosely or in an orderly fashion in the loading aid. For example, the loading aids have specific locations and receptacles for workpieces.

Both the support segment and the lifting console are configured to support a stack of loading aids arranged one above the other. In one embodiment, the support segment is configured to support this stack mediately. This is the case when the support segment carries a conveyor, which in turn carries the stack. In one embodiment, the lifting console is configured to directly and immediately support the stack. For this purpose, the lifting console comprises, for example, a support for loading aids that are arranged one above the other.

In an exemplary embodiment, the stacking device has a movable/mobile base. In this way, the stacking device can be coupled with a machine tool and/or further handling units as required. In this way, the machine tool and/or a manufacturing system provided therewith remain flexibly usable.

Automated feeding comprises at least partially automated workpiece exchange processes. In an exemplary embodiment, this comprises a fully automated transfer of workpieces to be processed between the first side of the stacking device, to which the conveyor can couple, and the machine tool for the actual machining, as well as a fully automated transfer of processed workpieces between the machine tool and the first side of the stacking device. It is understood that the movement of the workpieces can be partially singular, but also partially in groups (for example, batch-wise in the loading means). The stacking device is configured to transfer loading aids. Workpieces carried by the respective loading aid are thus moved back and forth between the first side and the second side. Further separation can then take place via a handling unit arranged between the stacking device and the machine tool.

In one embodiment, the stud frame comprises at least two vertical guides. A first vertical guide is assigned to the first side, with the support segment being mounted on the first vertical guide and guided in a vertically movable manner. A second vertical guide is associated with the second side, wherein the lifting console is mounted on the second vertical guide and is guided to be vertically movable. The at least one vertical guide can in each case comprise two or more guide rails arranged in parallel.

In an exemplary embodiment, the support segment and the lifting console are vertically movable with a pilgrim step characteristic during the transfer of a stack of loading aids between the first side and the second side, wherein the transfer of a loading aid between the first side and the second side is performed by a horizontal movement. The pilgrim step characteristic (pilger process) allows a transfer between the first and the second side even in the case of a transfer by means of a horizontal movement (without an additional vertical component during the movement of the loading aid during the transfer), and this is also the case when loading aids arranged one above the other engage in one another. The vertical component is therefore not generated on the side of the loading aid to be transferred, but by lifting or lowering the stack from which the loading aid is removed and/or on which the loading aid is placed.

In an exemplary embodiment, the lifting console and the support segment are arranged facing away from each other on the at least one vertical guide, for instance each on a separate, own vertical guide. In one embodiment, the lifting console and the support segment are mounted at the stud frame to be vertically movable, with the support segment extending in the direction towards the first side and the lifting console extending in the direction towards the second side.

According to an exemplary embodiment, the support segment and the lifting console are coupled to each other, for instance force-coupled, via a common traction means and can be moved in opposite directions along the at least one vertical guide at the stud frame. In operation, for example, the traction means is firmly connected to the lifting console and firmly connected to the support segment, respectively. This results in a motion coupling. When the support segment is moved by the vertical drive, the lifting console is also moved automatically, at least in a corresponding embodiment. In an alternative embodiment, this also applies vice versa. When the support segment moves upward, the lifting console moves downward, and vice versa.

According to another exemplary embodiment, the common vertical movements of the support segment and the lifting console each comprise a stroke of the same amount. This results in an oppositely directed vertical movement with the same stroke, respectively, at least according to an exemplary embodiment. The coupling of the support segment and the lifting console leads here to movements of the same amount, but in opposite directions.

This can be done, for example, by means of a common traction means that couples the support segment and the lifting console to each other. The traction means may be a toothed belt, a chain, a traction cable, a deflectable traction rod or the like. In an exemplary embodiment, the traction means is deflected in a manner similar to an upside-down U in an upper region of the stud frame. The deflection may be by a pulley, wheel or the like.

It is conceivable to design the traction means as an open traction means, similar to an upside-down U or an upright U. However, it is also conceivable to design the traction means as a closed traction means. In such a case, it is conceivable to provide a deflection for the traction means in the upper area of the stud frame and in the lower area of the stud frame.

The traction means can also be a combined traction/push means, so that not only traction forces can be transmitted. The driving force can be introduced directly into the traction means. However, it is also conceivable to introduce the drive force in another way and to provide the traction means primarily for motion coupling between the support segment and the lifting console.

In an exemplary embodiment, the support segment and the lifting console are each connected to the coupling member via a holding piece for vertical motion entrainment. In other words, the support segment and the lifting console can be attached to the coupling member so that when the coupling member moves, corresponding movements of the support segment and the lifting console follow.

According to a further exemplary embodiment, the support segment is configured to engage under and lift a rollable conveyor that is configured to receive a stack of loading aids arranged one above the other, the lifting console having a support for directly receiving a stack of loading aids. The lifting console is thus not configured to engage under and lift the conveyor. The lifting console is configured to pick up loading aids directly. The support segment is configured to lift loading aids mediately via the intermediate conveyor.

According to another exemplary embodiment, the vertical drive acts on the support segment to move the support segment and mediately the lifting console vertically in opposite directions. It is conceivable to couple the vertical drive to the support segment independently of the coupling member. For this purpose, the vertical drive can act directly on the support segment. The support segment is connected via the coupling member (for example a belt or similar traction means) to the lifting console for motion entrainment.

The vertical movement can include a step characteristic or pilgrim step characteristic, in regard of the respective vertical position. In this way, a stack of loading aids, which are accommodated on the support segment, can be gradually removed on the first side, and a stack of loading aids can be built up on the lifting console on the second side as a result.

In an exemplary embodiment, the vertical drive comprises a motor acting on a lead screw drive or ball screw drive with a vertical main extension direction. In this way, a stationary motor can be provided, whose output (for example, lead screw) is directly or mediately coupled to the support segment. In this way, the support segment can be controlled with sufficient accuracy to bring about the desired movement characteristic (step characteristic or pilgrim step characteristic).

In an exemplary embodiment, for the purpose of driving the coupling member, the motor of the vertical drive is therefore not directly connected to the coupling member, which is configured, for example, as a traction means. Instead, in this embodiment, the traction means is driven mediately via an output element (for example, threaded spindle) of the motor and via the support segment, which is coupled both to the traction means and to the output element. Furthermore, this can increase safety in the event of failure of the coupling member, since the output element is not directly affected.

It is nevertheless also conceivable to couple the motor of the vertical drive directly to the traction means. This is suitable for embodiments, in which the traction means is configured for form-fit driving, for example as a chain or toothed belt.

In an exemplary embodiment, the vertical drive is arranged on the first side to act on the support segment there. Essential components of the drive, for example the motor, primary power transmission and the like, are arranged on the first side. This also helps to keep the second side accessible for handling units in order to separate workpieces there or to collect them in a loading aid.

In other words, by way of example, a control device is thus provided, which controls the vertical drive in such a way that the support segment and the lifting console can be moved vertically in steps, possibly with pilgrim step characteristics, during the transfer of a stack of loading aids between the first side and the second side, due to the coupling formed therebetween.

The pilgrim step characteristic can be helpful, for example, if a sufficient vertical distance must be ensured between a bottom side of a loading aid and a loading aid of a stack arranged thereunder so that a transfer between the first and second sides can take place exclusively or almost exclusively via a horizontal movement. This applies equally to the last (lower) loading aid of a stack, which rests directly on the lifting console and/or directly on the conveyor at the support segment. In this way, for example, interfering loading aids can be disengaged from each other.

According to a further exemplary embodiment, there is also provided a transfer unit, which is configured to transfer a loading aid between the first side and the second side, wherein for instance a transfer opening is formed at the stud frame, which can be passed by the transfer unit, and which can be passed by a loading aid. The transfer unit may also be referred to as a relocating device. According to an exemplary embodiment, the stud frame supports the transfer unit. According to an exemplary embodiment, the transfer opening can be passed by exactly one loading aid, wherein several loading aids can pass the transfer opening one after the other.

In an exemplary embodiment, the transfer unit is arranged above the support segment and the lifting console. The transfer unit ensures a transfer of loading aids between the first side and the second side. In an exemplary embodiment, the first side and the second side are separated from each other, at least sectionally, for instance by a partition wall, the partition wall being interrupted by the transfer opening.

According to an exemplary embodiment, the transfer opening is formed in the upper region of the stud frame. By way of example, the transfer opening has a height and width that are adapted to the height and width of the loading aids so that a loading aid can pass through the transfer opening, but that there is not an opening between the first and second sides that is too large. A single loading aid can pass the transfer opening. This leads to a specific handling of the individual loading aids when a stack of several loading aids is to be transferred between the first and the second side.

In an exemplary embodiment, the stud frame is thus closed by a partition wall apart from the transfer opening between the first and second sides. In one embodiment, the transfer opening is arranged in the upper region of the stud frame and is configured in such a way that two loading aids that are arranged one above the other cannot be passed therethrough.

According to another exemplary embodiment, the transfer unit comprises a hanging carrier having a locking mechanism for gripping and holding a loading aid. In an exemplary embodiment, the hanging carrier engages the loading aid from above to grip and hold it. This may be done in a form-fitting and/or friction-locked manner. The locking mechanism may be configured as an active or passive locking mechanism, i.e. configured with its own drive or without its own drive. The hanging carrier is configured, for example, as a shuttle that is moved back and forth horizontally between the first side and the second side.

According to another exemplary embodiment, the common vertical drive of the support segment and the lifting console is controlled in a targeted manner in order to approach a desired vertical position with respect to the transfer unit for picking up or delivering a loading aid. This includes a corresponding counter movement of the other part, respectively. The gripping of the loading aid by the hanging carrier can comprise a targeted transfer stroke by the support segment and/or the lifting console. The delivery of the loading aid by the hanging carrier may comprise a targeted takeover stroke by the support segment and/or the lifting console. This takes into account the fact that, according to certain embodiments, the hanging carrier itself cannot be moved vertically.

According to another exemplary embodiment, the transfer unit has a horizontal drive that is arranged substantially on the first side at least when the horizontal drive has approached the first side. By way of example, the horizontal drive is arranged above the support segment on the first side. By way of example, the horizontal drive is completely or almost completely located on the first side when the hanging carrier has moved to the first side. In this way, there is good accessibility from above on the second side. This can be used, for example, by a handling unit that removes workpieces from an upper loading aid or deposits them therein.

In an exemplary embodiment, the horizontal drive comprises an actuator in the form of a cylinder. Exemplarily, the horizontal actuator comprises a fluidic cylinder that can be moved between two end positions. For example, such a cylinder comprises a cylinder housing with an extendable piston rod. However, actuators other than fluidic actuators are also conceivable, such as electric motors with threaded spindles or ball screw spindles that cooperate with nut-like shaped counterparts to generate a linear motion. In an exemplary embodiment, the transfer unit does not have a vertical drive. In contrast, the loading aids are provided by the vertical drive, which moves the support segment and the lifting console.

According to another exemplary embodiment, the transfer unit is positioned in a first position on the first side in such a way that a loading aid carried by the lifting console on the second side is freely accessible from above for a handling unit. This applies to the upper loading aid of a respective stack. The transfer unit therefore does not interfere with further transfer steps and separation steps. In the context of the present disclosure, freely accessible is to be understood as meaning that a handling unit can reach any places for workpieces in the loading aid.

According to another exemplary embodiment, the transfer unit has a horizontally movable horizontal carriage, which for instance can be moved horizontally in a constant vertical position. The hanging carrier is mounted on the horizontal carriage or is integrally formed therewith.

According to another exemplary embodiment, the transfer unit can be telescoped horizontally, the transfer unit having for instance a double guide, which can be moved relative to a guide base and has two parallel guide sections, one of which is assigned to the guide base and another to the horizontal carriage. In this way, the horizontal installation space of the transfer unit can be limited, but sufficiently large horizontal travel distances can still be achieved.

According to a further exemplary embodiment, the horizontal carriage, the guide base and the double guide are coupled to each other via a traction means in such a way that when the double guide moves relative to the guide base, the horizontal carriage is moved relative to the double guide, for instance in the same direction. In this way, there is a coupled movement so that, for a given travel distance of the horizontal drive, a greater travel distance of the hanging carrier arranged on the horizontal carriage is possible. The coupled motion allows the travel distance of the horizontal drive to be converted into a travel distance of the horizontal carriage that is twice as large, at least in an exemplary embodiment.

In an exemplary embodiment, the guide base is firmly fixed to the stud frame. The double guide can be moved along the guide base relative to the stud frame by the horizontal drive. The double guide carries a coupling member configured, for example, as a traction means, which is coupled on the one hand to the base guide and on the other hand to the horizontal guide for motion entrainment. The traction means is, for example, a toothed belt, a chain, a traction cable, a deflectable traction rod or the like. In an exemplary embodiment, the double guide has a deflection for the traction means at each of its two ends. In this way, the telescoping capability of the transfer unit results, wherein no additional actuator is required.

According to another exemplary embodiment, the horizontal drive of the transfer unit is directly coupled to a coupling member of the transfer unit that is configured as a traction means. In this way, the horizontal drive can be configured, for example, as a rotary drive and control the coupling member for moving the hanging carrier. This is suitable, for example, for coupling members that are configured for form-fit movement, such as toothed belts or chains.

According to a further exemplary embodiment, on each of the first side and the second side two locations for receiving a stack of loading aids are formed, wherein the two stacks can be controlled and moved independently of one another. In this way, the capacity of the stacking device is increased. In an exemplary embodiment, both stacks on the second side can be reached by one and the same handling unit. By providing two locations on the first side and the second side, two functionally parallel conveyor paths can be realized, via which loading aids with workpieces can be fed or discharged. It is understood that also embodiments with more than two locations on each of the first and the second side and correspondingly more than two conveyor paths are conceivable. In this manner, the workpiece capacity can be increased.

In one embodiment, each of the two paths comprises a support segment and a lifting console, for which a common vertical drive is available for each path, and wherein furthermore a transfer unit with horizontal drive is assigned to each path. In an exemplary embodiment, the two paths are provided for parallel operation. In an exemplary embodiment, this excludes a transfer of individual loading aids within the stacking device between the two paths.

If two such paths are provided, it is possible to supply workpieces to the second side in parallel with main time and, if necessary, to switch between different loading aids in parallel with main time. In this way, unproductive auxiliary process times are further reduced. Using the two paths also makes it possible to switch between different workpieces or different processing tasks, wherein a further stack with loading aids can be provided on the second side in addition to the currently active stack, which is seamlessly available for handling tasks.

In one embodiment, the two locations are arranged next to each other so that two stacks can be handled side by side. The individual stacks can be processed in parallel with main time. This is also suitable for two stacks with workpieces of the same type. In the event of a transfer of a loading aid of one of the two stacks, the handling unit can approach the other stack.

Providing two paths, each with two locations on the first side and the second side, also increases the storage capacity of the stacking device. The dual structure provides increased redundancy during machining. It is also conceivable to use one path for providing workpieces to be processed (blanks or semi-finished parts) and to use the other path for receiving and delivering processed workpieces (finished parts). This is conceivable, for example, if one and the same loading aid cannot or should not pick up both workpieces before machining and workpieces after machining.

According to a further aspect, the present disclosure further relates to an automation module comprising a stacking device according to at least one of the embodiments described herein, and a handling unit adapted to transfer workpieces between a loading aid provided by the stacking device and a machine tool.

Such an automation module can be configured to be mobile. If required, the automation module can be coupled to a machine tool. Accordingly, the stacking device and the handling unit can be structurally combined. Other designs are conceivable. The automation module with the handling unit manages a workpiece change, i.e. loading and unloading of the machine tool. The handling unit can remove workpieces from and deliver them to the loading aids provided on the second side of the stacking device. Since the stacking device can have a considerable buffer capacity, a batch of workpieces can be processed in a semi-automated or fully automated manner. This includes, by way of example, loading and unloading, i.e. workpieces before machining and after machining in the machine tool.

The transfer between the stacking device and the machine tool can be direct or indirect. It is conceivable to consider further buffer storages. The handling unit is exemplarily configured as a robot or handling robot. In an exemplary embodiment, it is an articulated-arm robot. This is not to be understood in a restrictive manner. In an exemplary embodiment, the handling unit is ground-mounted (upright-mounted). In an exemplary embodiment, the handling unit is mounted on the ceiling side (suspended).

According to another aspect, the present disclosure relates to a manufacturing system comprising a machine tool and an automation module according to at least one of the embodiments described herein.

According to a further aspect, the present disclosure relates to a manufacturing system comprising a machine tool and a stacking device according to at least one of the embodiments described herein, wherein in certain embodiments a handling unit is provided, which is interposed between the stacking device and the machine tool for transferring workpieces between the stacking device and the machine tool.

The machine tool is in for instance a processing machine. In general, the machine tool is a machine for subtractive and/or additive machining.

According to a further aspect, the above and other objects are achieved by a method for feeding a machine tool, for instance for an automated workpiece change, the method comprising the following steps:
  providing a stacking device, which has a base, a stud frame supported by the base and carrying at least one first vertical guide and at least one second vertical guide, a first side with a vertically movable support segment for receiving a conveyor that carries two or more loading aids that are arranged one above the other, wherein the first vertical guide is assigned to the first side, and wherein the support segment is moveable along the first vertical guide, a second side with a vertically movable lifting console for receiving at least one loading aid, which is configured to carry two or more loading aids that arranged one above the other, wherein the second vertical guide is assigned to the second side, and wherein the lifting console is moveable along the second vertical guide, and wherein the support segment and the lifting console are arranged facing away from each other at the stud frame, and a transfer unit, which is configured to transfer a loading aid horizontally between the first side and the second side, wherein the support segment and the lifting console are coupled to each other in a forced coupling via a common coupling member and can be moved vertically in opposite directions at the stud frame via a common vertical drive,
  feeding a conveyor carrying a stack of at least two loading aids that are arranged one above the other to the first side,
  taking up the conveyor with the loading aids by the support segment,
  vertically moving the support segment so that an upper loading aid can be gripped by the transfer unit,
  gripping the upper loading aid by the transfer unit,
  horizontally moving the loading aid with the transfer unit from the first side to the second side, and
  vertically moving the lifting console in such a way that the loading aid can be deposited as an upper loading aid by the transfer unit on the lifting console or on a loading aid already provided there,
  wherein the vertical movement of the support segment and the vertical movement of the lifting console involves a forced coupling and in for instance a pilgrim step characteristic.

It is understood that the method according to the present disclosure can be configured analogously to the embodiments of the stacking device, the automation module and the manufacturing system according to the present disclosure, and vice versa. The method according to the present disclosure can use the stacking device according to the present disclosure. The stacking device according to the present disclosure is suitable for use in the method according to the present disclosure. The same applies to the automation module according to the present disclosure.

The method according to the present disclosure permits semi-automated or fully automated provision of loading aids with a plurality of workpieces, with good accessibility for separation. Furthermore, the coupled or force-coupled vertical movement of the support segment and the lifting console enables coordinated movement in a simple manner without the need for separate drive units.

A stack usually comprises two or more loading aids. The upper loading aid of a stack is in each case the loading aid accessible from above, which is arranged above at least one further loading aid. If, in one embodiment, only one loading aid is arranged on the lifting console or the support segment, this can also be understood as the upper loading aid.

The coupled movement of the support segment and the lifting console simplifies the transfer of a plurality of loading aids between the first side and the second side. In other words, the support segment with the conveyor is raised gradually as a stack of loading aids there is transferred piece by piece by the transfer unit to a stack that is formed on the lifting console on the second side. This involves an equally gradual lowering movement of the lifting console.

The vertical movements of the support segment and the lifting console are adapted to each other. The output height (or the output height offset between the support segment and the lifting console) can be influenced by adjusting the length of the coupling member between the support segment and the lifting console. The vertical movements of the support segment and the lifting console can have a pilgrim step characteristic if an upper loading aid is to be lifted off from and/or set down onto a loading aid arranged underneath, respectively.

According to an exemplary embodiment of the method, the transfer unit is moved horizontally back to the first side after the loading aid has been deposited from the second side, so that a further loading aid is removed from the conveyor and deposited on the loading aid already waiting on the lifting console, the removal of individual workpieces for machining purposes taking place starting with the upper loading aid of a stack held by the lifting console.

According to this embodiment, the entire stack (several loading aids) is thus transferred between the first side and the second side. Starting with the upper loading aid of the stack on the second side (this loading aid may have been the lower loading aid of the stack on the first side), the handling unit can start separating and transferring the workpieces.

According to another exemplary embodiment, workpieces are deposited in the upper loading aid of the stack held by the lifting console after processing, so that when completely filled, the upper loading aid can be moved by the transfer unit from the second side back to the first side. This includes, for example, coupled and mutually opposing vertical travel movements of the support segment and the lifting console.

Thus, starting with the upper loading aid, the stack is transferred back to the first side. This is also possible with an empty loading aid if processed workpieces are discharged elsewhere. In other words, the parts to be processed in a stack are first transferred completely from the first side to the second side. There, starting with the upper loading aid, the transfer to the machine tool is begun.

Processed workpieces can be deposited in the same loading aid. It is also conceivable to deposit processed workpieces in a different loading aid, for example in a further location belonging to a second conveyor path. When an upper loading aid is completely emptied or a complete exchange of unprocessed workpieces by processed workpieces has been completed, this loading aid can be transferred back to the first side using the transfer unit. This can be continued with the other loading aids arranged below.

It is to be understood that the previously mentioned features and those mentioned in the following may not only be used in the respectively indicated combination, but also in other combinations or as isolated features without leaving the spirit and scope of the present disclosure.

BRIEF DESCRIPTION OF THE DRAWINGS

Further features and advantages of the present disclosure will be apparent from the following description and explanation of several exemplary embodiments with reference to the drawings, wherein.

EMBODIMENTS

Figure 1:
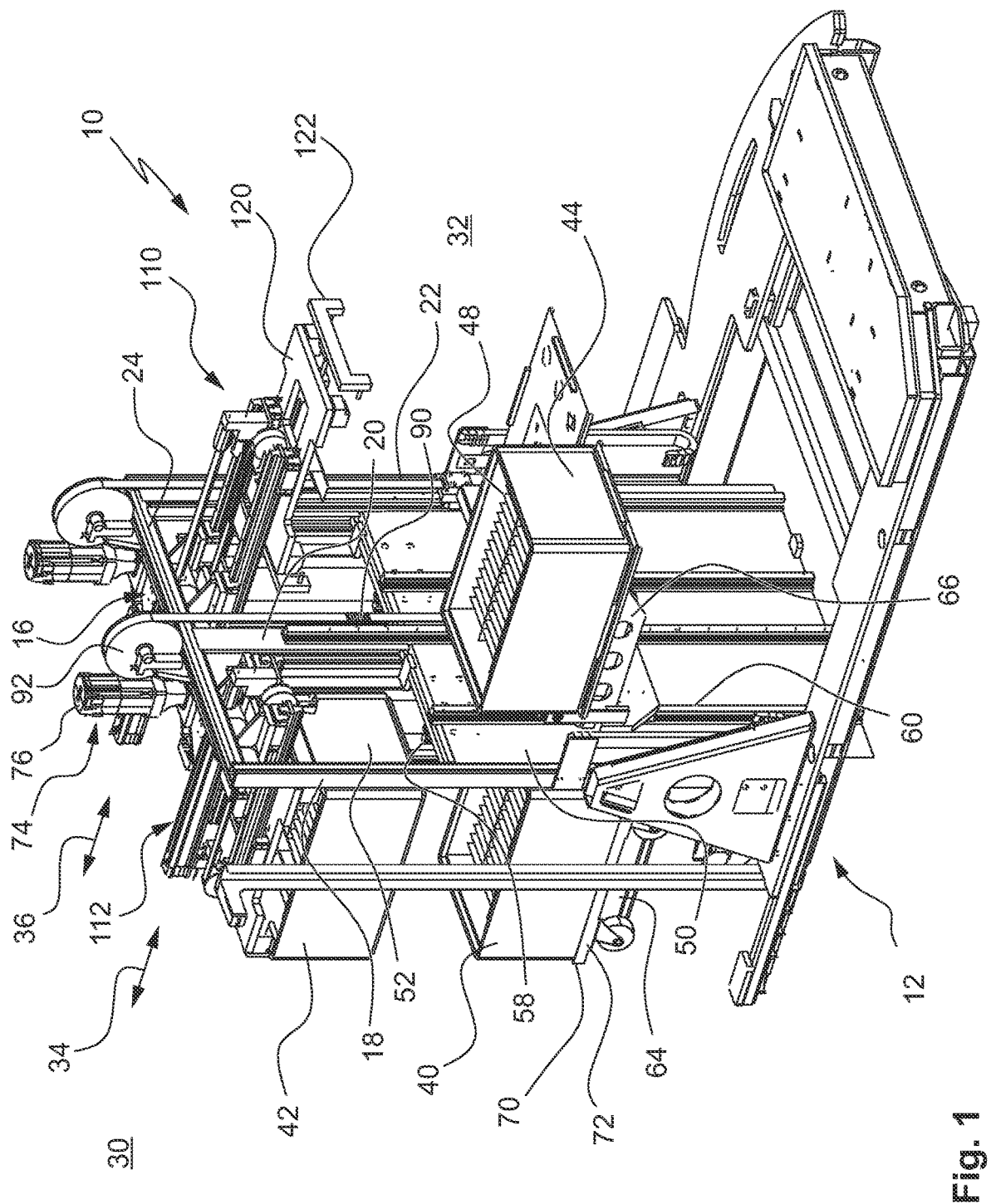
FIG. 1: is a perspective view of an embodiment of a stacking device.

With reference to FIG. 1 and with supplementary reference to FIGS. 2-5, exemplary designs, features and functionalities of a stacking device that is in total designated by are illustrated.

Figure 2:
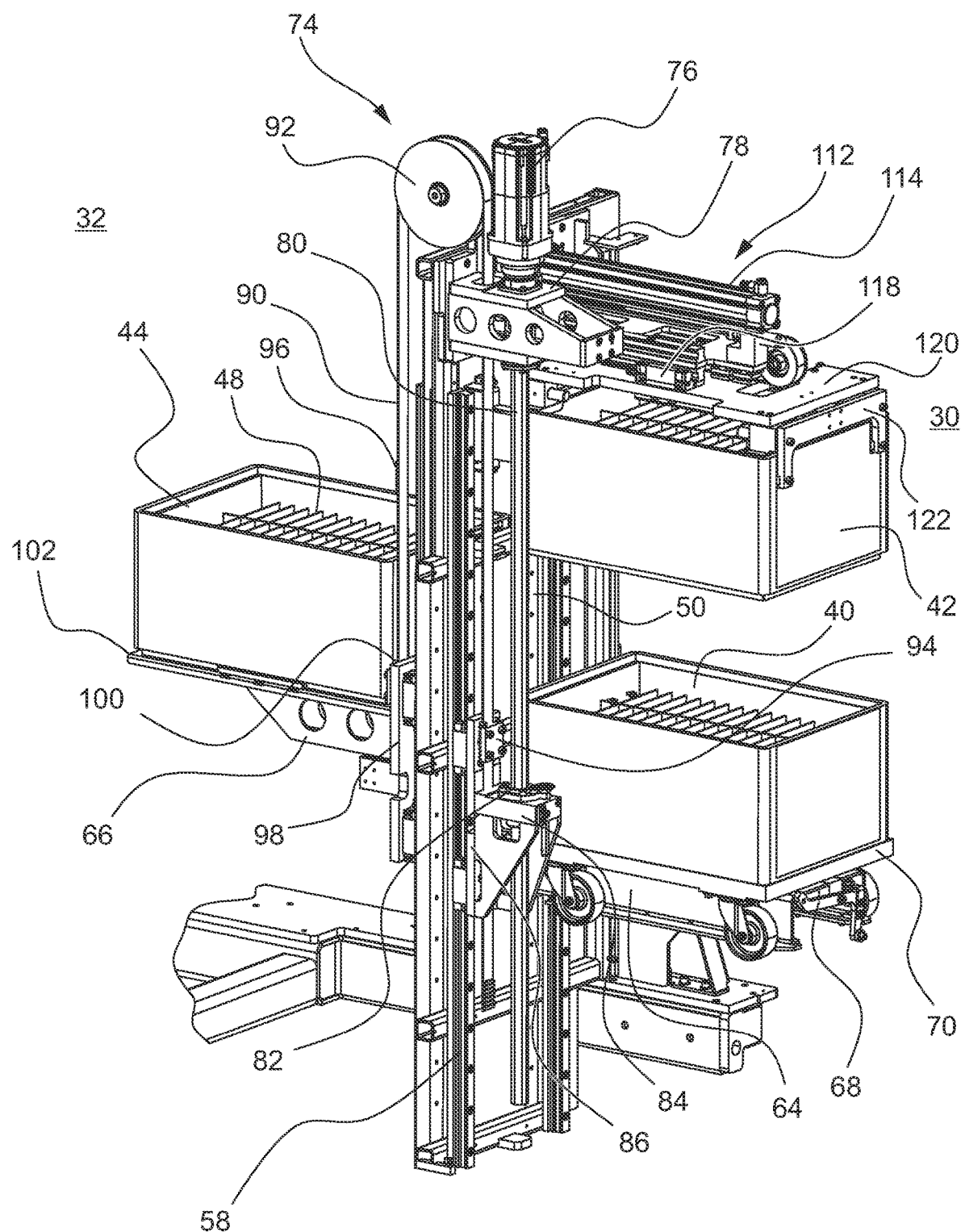
FIG. 2: is a further detailed perspective view of the stacking device according to FIG. 1 to illustrate a lifting drive, in a different orientation, with various components hidden for illustrative reasons.
Figure 3:
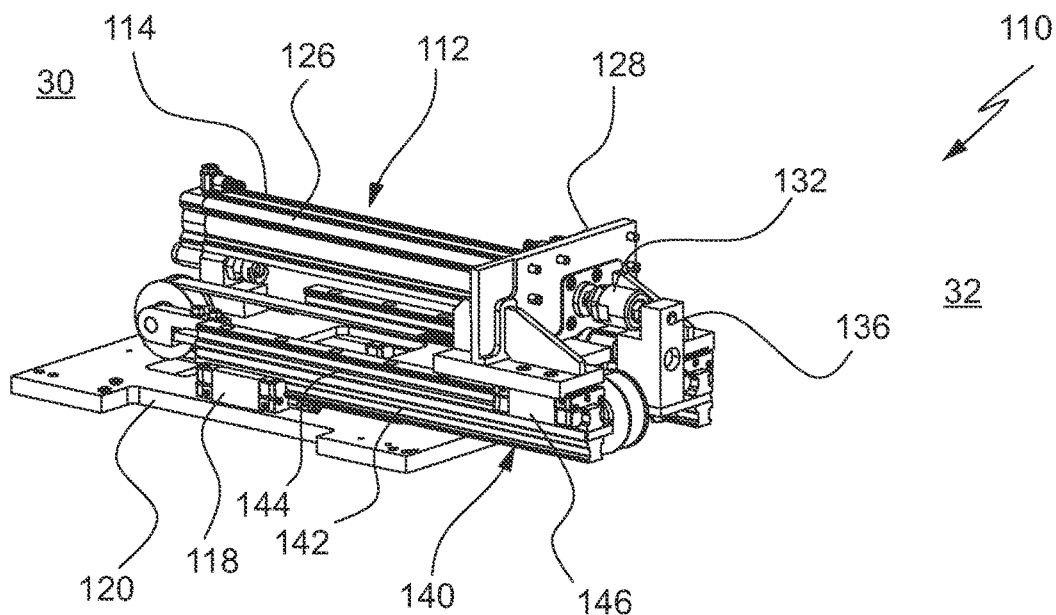
FIG. 3: is a further detailed perspective view of the stacking device according to FIG. 1 to illustrate a transfer unit with a horizontal drive, wherein various components are hidden for illustrative reasons.
Figure 4:
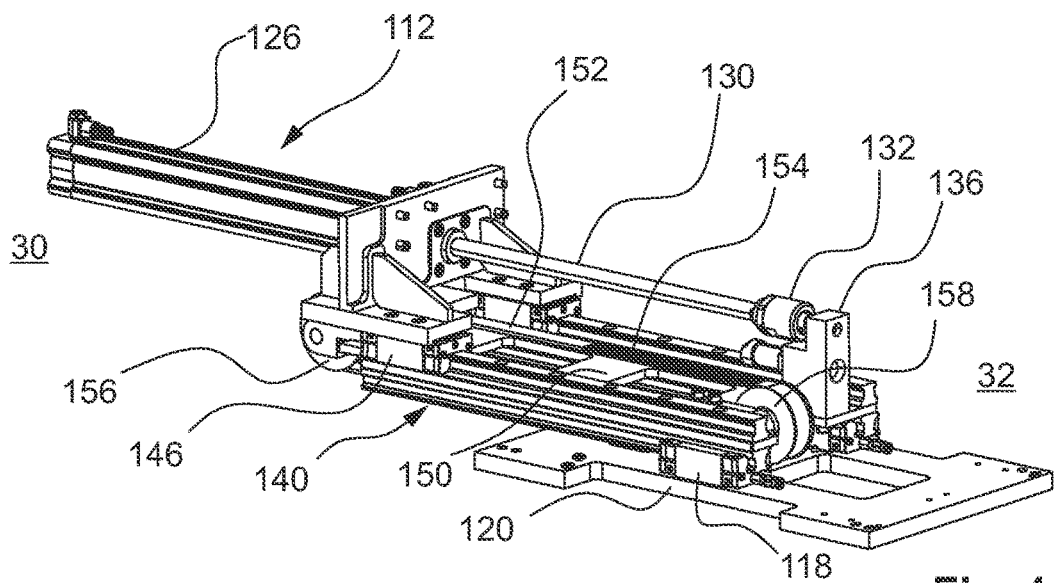
FIG. 4: is a detailed perspective view based on FIG. 3, with the transfer unit shown in an operating position different from that of FIG. 3.
Figure 5:
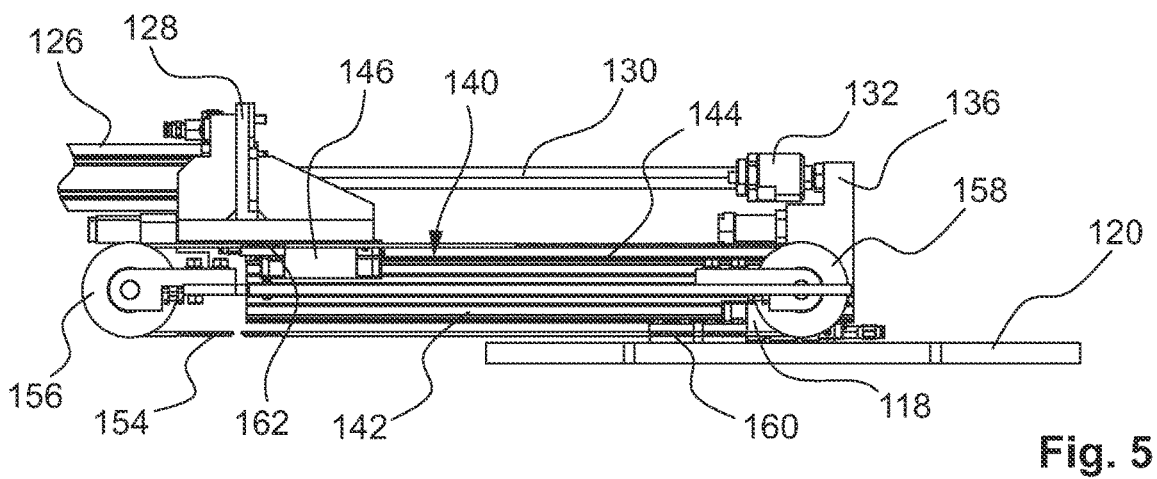
FIG. 5: is an enlarged side view based on the illustration in FIG. 4.

FIG. 1 shows a perspective view of a stacking device 10. FIG. 2 shows a detailed view of the stacking device 10 in a different orientation from that of FIG. 1. FIGS. 3-5 illustrate different states of an assembly of the stacking device 10 by means of detailed views. The stacking device 10 may also be referred to as a palletizing device and/or a combined palletizing and de-palletizing device 10. The stacking device 10 is suitable for use in connection with the automation of machine tools.

The stacking device 10 includes a base 12, which may also be referred to as a rack or frame. The base 12 may be configured to be rollable or mobile. The base 12 supports a stud frame 16, which in the exemplary embodiment includes vertically oriented uprights 18, 20, 22 and a crossbeam 24. The crossbeam 24 may also be referred to as the upper crossbeam.

The stacking device 10 includes a first side 30 and a second side 32. In the exemplary embodiment, the stud frame 16 separates the first side 30 and the second side 32. The exemplary embodiment according to FIG. 1 further comprises a first conveying path 34 and a second conveying path 36, compare the double arrows in FIG. 1. The two conveying paths 34, 36 are arranged independently of each other. With respect to the detailed design, the conveyor paths 34, 36 are similar or identically configured, so that the following explanations are applicable to both conveyor paths 34, 36.

The stacking device 10 is used for transferring a plurality of loading aids 40, 42, 44, 46 (compare also FIGS. 6-12) with workpieces accommodated therein between the first side 30 and the second side 32. The loading aids 40, 42, 44, 46 are exemplarily formed as pallets, containers, bins, trays and the like. In an exemplary embodiment, the loading aids 40, 42, 44, 46 have locations 48 for receiving a plurality of workpieces.

In the exemplary embodiment, the stud frame 16 supports a partition wall 50 that extends substantially vertically (along a vertically oriented plane). The partition wall 50 separates the first side 30 and the second side 32 from each other. A transfer opening 52 is formed above the partition wall 50. In the exemplary embodiment, a transfer opening 52 is provided for each of the first conveying path 34 and the second conveying path 36. In the exemplary embodiment, the transfer opening 52 has a width and height, respectively, which allows it to be passed through by a loading aid 40, 42, 44, 46. The transfer opening 52 is configured, for example, in such a way that exactly one loading aid 40, 42, 44, 46 can pass.

The stud frame 16 carries at least one vertical guide 58, 60. In the exemplary embodiment, a first vertical guide 58 is provided, which faces the first side 30, compare also FIG. 2. Furthermore, a second vertical guide 60 is provided, which faces the second side 32. Each of the vertical guides 58, 60 comprises two guide rails in the exemplary embodiment. This is not to be understood to be limiting. At the first vertical guide 58, a support segment 64 is arranged to be vertically movable. A lifting console 66 is arranged to be vertically movable on the second vertical guide 60.

In the exemplary embodiment (compare FIG. 2), a locking feature 68 is associated with the support segment 64. The support segment 64 is configured to engage underneath and lift a conveyor 70. The locking feature 68 secures the position of the conveyor 70 to the support segment 64. The conveyor 70 is, for example, a conveyor carriage 72. Other conveyors or floor conveyors are conceivable. The conveyor 70 is configured to receive a stack of loading aids 40, 42, 44, 46 and can be fed with them to the first side 30 of the stacking device 10. The loading aids 40, 42, 44, 46 do not have to be removed from the conveyor 70 beforehand. The loading aids 40, 42, 44, 46 can enter the stacking device 10 together with the conveyor 70 and be lifted there by the support segment 64. In the exemplary embodiment, the support segment 64 engages underneath a base plate of the conveyor carriage 72 between its wheels in order to lift the conveyor carriage 72.

The stacking device 10 has a vertical drive 74. A vertical drive 74 is provided for each conveyor path 34, 36. In the exemplary embodiment, the vertical drive 74 comprises a motor 76, which is arranged at the upper end of the stud frame 16, for example in the vicinity of the crossbeam 24. The motor 76 is seated on a motor bracket 78, which is connected to the stud frame 16 in a manner fixed to the frame, compare FIG. 2. The motor 76 is exemplarily configured as an electric motor. The motor 76 drives a spindle 80, which is exemplarily configured as a threaded spindle or ball screw. In the exemplary embodiment, the spindle 80 cooperates with a driving nut 82. When the spindle 80 rotates, the drive nut 82 is moved vertically.

A vertically movable travel console 84 supports the drive nut 82. The travel console 84 is connected to the support segment 64 and is jointly mounted for vertical travel on the vertical guide 58 via a carriage 86. When the motor 76 of the vertical drive 74 is actuated to rotationally drive the spindle 80, this causes a vertical movement of the travel console 84 carrying the driving nut 82 and consequently a vertical movement of the support segment 64. In this way, the conveyor 70 together with the stack of loading aids 40, 42, 44, 46 arranged thereon can be raised or lowered.

In accordance with the present disclosure, the movement of the support segment 64 on the first side 30 is coupled to the movement of the lifting console 66 on the second side 32. In the exemplary embodiment, this takes place via a coupling member 90, compare again FIG. 1 and FIG. 2. In the exemplary embodiment, the coupling member 90 is guided via a deflection 92, for example a deflection roller. The coupling member 90 is exemplarily configured as a traction means 96. The traction means 96 is exemplarily configured as a toothed belt, a pull rod, a pull wire, a strand, a belt, a chain, or the like. In the following, the exemplary design of the traction means 96 as a toothed belt is referred to for illustrative purposes.

FIG. 2 illustrates that the coupling member 90, configured here as a traction means 96, is guided between the first side 30 and the second side 32 in a manner similar to an inverted U using the deflection 92. A first end of the coupling member 90 is connected to the carriage 86, and consequently to the travel console 84 and the support segment 64, by a holding piece 94 for motion entrainment. A second end of the coupling member 90 is connected to the lifting console 66 for motion entrainment. In the exemplary embodiment, this is done via a holding piece 100 that is arranged on a carriage 98, which is assigned to the second end of the coupling member 90. The carriage 98 of the lifting console 66 is arranged on the second vertical guide 60 to be vertically movable.

The lifting console 66 further comprises a support 102 for (directly) receiving loading aids 40, 42, 44, 46. In the exemplary embodiment according to FIGS. 1 and 2, loading aids 40, 42, 44, 46 are arranged directly on the support 102 of the lifting console 66 on the second side 32. On the other hand, the support segment 64 arranged on the first side 30 serves to mediately receive such loading aids 40, 42, 44, 46. The loading aids 40, 42, 44, 46 are arranged on the support segment 64 on the first side 30 mediately via the conveyor 70 and/or are held by the latter, respectively.

In addition to the vertical drive 74, the stacking device 10 includes a transfer unit 110 having a horizontal drive 112. The design of the transfer unit 110 is illustrated with supplementary reference to FIGS. 3-5. The transfer unit 110 is disposed above the support segment 64 and the lifting console 66. In the exemplary embodiment, the transfer unit 110 is arranged at the upper end of the stud frame 16, adjacent to the crossbeam 24.

The transfer unit 110 includes the horizontal drive 112. The horizontal drive 112 includes an actuator 114, which in the exemplary embodiment is configured as a cylinder or linear cylinder. The actuator 114 may be a fluidic actuator. This is not to be understood to be limiting. The transfer unit 110 further comprises a horizontal carriage 118 that can be directly or mediately moved horizontally by the actuator 114. In this way, loading aids 40, 42, 44, 46 that have been moved vertically by the vertical actuator 74 of the support segment 64 and/or the lifting console 66 can be exchanged horizontally between the first side 30 and the second side 32.

In the exemplary embodiment, the horizontal carriage 118 carries a hanging carrier 120 that includes a locking mechanism 122 (compare FIG. 1 and FIG. 2). In an exemplary embodiment, the locking mechanism 122 is configured to hold and secure a (single) loading aid 40, 42, 44, 46 to the hanging carrier 120 in a form-fit and/or friction-locked manner. The hanging carrier 120 is configured to contact an upper side of a loading aid 40, 42, 44, 46 and/or to secure an upper region of the loading aid 40, 42, 44, 46 with the locking mechanism 122.

Similar to a shuttle, the hanging carrier 120 can be moved back and forth between the first side 30 and the second side 32. The hanging carrier 120 is configured to grip and hold a loading aid 40, 42, 44, 46. FIG. 3 illustrates a condition, in which the hanging carrier 120 is disposed on the first side 30. FIGS. 4 and 5 illustrate a condition, in which the hanging carrier 120 is arranged on the second side 32.

In the exemplary embodiment according to FIGS. 3-5, the transfer unit 110 is telescopic. This may have the effect that, at least in the position shown in FIG. 3, the second side 32 is not or only insignificantly blocked by the transfer unit 110. Thus, the second side 32 is accessible to a handling unit, for example, in order to remove workpieces from a loading aid 40, 42, 44, 46 or to transfer them to it.

In the exemplary embodiment, the actuator 114 of the horizontal drive 112 includes a housing 126, which may also be referred to as a cylinder. The housing 126 is attached to a retaining plate 128, which in turn is fixed to the stud frame 16 in a manner fixed to the frame. The actuator 114 further includes a rod 130, which may also be referred to as a piston rod. The rod 130 can extend from or retract into the housing 126. The rod 130 includes a head piece 132, which in the exemplary embodiment is coupled to a driver 136. When the housing 126 is fixed to the frame, the driver 136 can be moved horizontally in translation via the rod 130 and the head piece 132.

The carrier 136 is coupled to a double guide 140 for motion entrainment. When the driver 136 is moved horizontally by the actuator 114, the double guide 140 is also moved horizontally. The double guide 140 has a first guide section 142 and a second guide section 144. The first guide section 142 is coupled to the horizontal carriage 118. The second guide section 144 is coupled to a guide base 146 that is fixed to the support plate 128 and/or the housing 126 of the actuator 114. In the exemplary embodiment, the first guide section 142 is a lower guide section and the second guide section 144 is an upper guide section.

The movement of the rod 130 and the head piece 132 directly moves the double guide 140 relative to the guide base 146 via the driver 136. In the exemplary embodiment, the double guide 140 has two parallel double guide rails that are connected to each other via an intermediate plate 150.

The horizontal guide 118 is functionally coupled to the guide base 146 and the dual guide 140 via a coupling member 152, which is in the exemplary embodiment formed as a traction means 154. The coupling member 152 may be in the form of a chain, belt, or otherwise configured as a traction means 154. In the exemplary embodiment, the traction means 154 is a toothed belt.

In the exemplary embodiment, the coupling member 152 is a circumferential coupling member and is guided via two deflections 156, 158. The deflections 156, 158 are each configured as rollers. The coupling member 152 is fixedly coupled to the horizontal carriage 118 and/or the hanging carrier 120 via a holding piece 160 for motion entrainment. The coupling member 152 is fixedly coupled to the guide base 146 and/or the support plate 128 via a holding piece 162 for motion entrainment. This functional coupling results in the fact that, on the one hand, when the actuator 114 is extended via the rod 130, the double guide 140 is directly moved translationally and horizontally, and that, furthermore, along the double guide 140, the horizontal carriage 118 and, along with it, the hanging carrier 120 are additionally moved translationally and horizontally, for instance in the same direction. In this way, the telescoping movement of the transfer unit 110 results. A loading aid 40, 42, 44, 46 can be moved by the transfer unit 110 between the first side 30 (support segment 64) and the second side 32 (lifting console 66).

The telescopic feature of the transfer unit 110 may have the effect that essential components of the transfer unit 110 that are fixed to the frame are arranged on the first side 30, and that in a position of the hanging carrier 120 on the first side 30 (compare FIG. 3) the second side 32 is not or not excessively occupied by the transfer unit 110. In other words, the second side 32 is available for a handling unit or the like. The transfer unit 110 can be moved completely or almost completely onto the first side 30.

Figure 6:
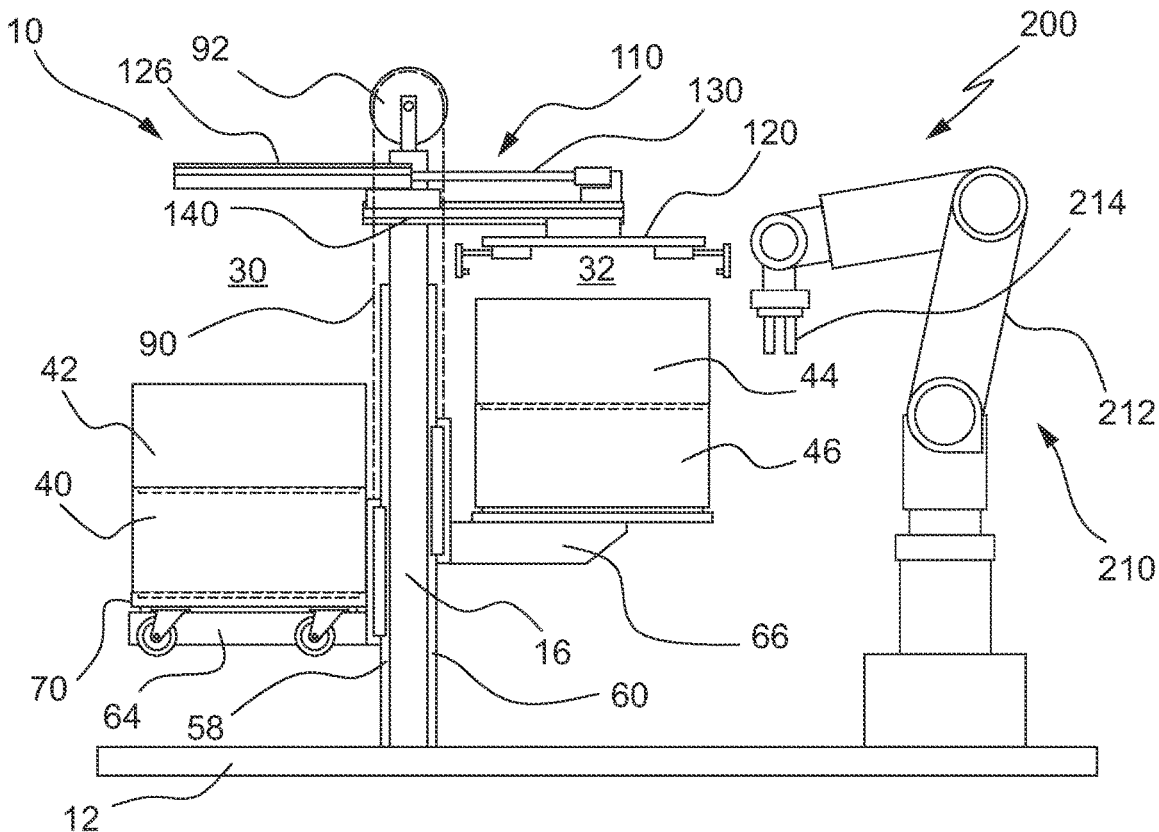
FIG. 6: is a schematic side view of an embodiment of an automation module with a stacking device and a handling unit.
Figure 7:
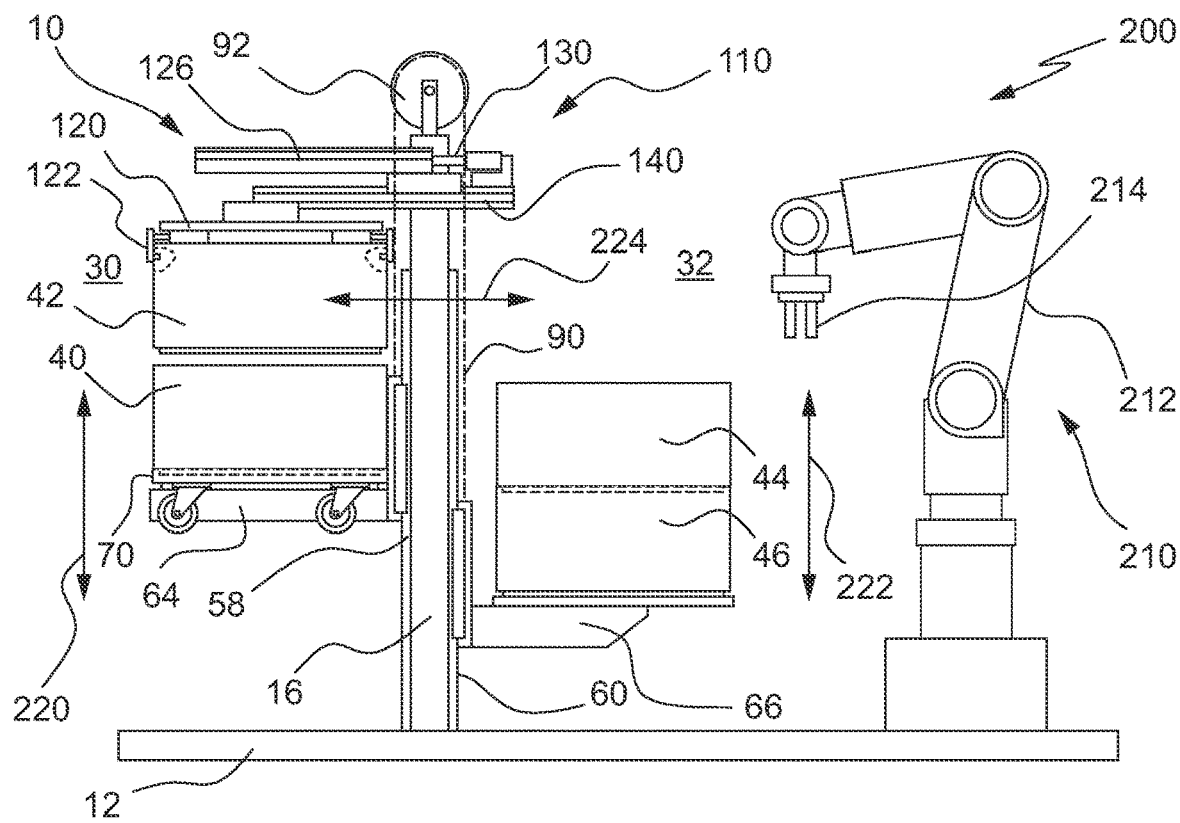
FIG. 7: is a further view of the automation module according to FIG. 6, with the stacking device shown in an operating position different from that of FIG. 6.

FIG. 6 and FIG. 7 illustrate an automation module, designated by 200, comprising the stacking device 10 and a handling unit 210. In the exemplary embodiment, the stacking device 10 and the handling unit 210 use the same base 12. The handling unit 210 is associated with the second side 32 of the stacking device 10. In other words, the stacking device 10 can transfer loading aids 40, 42, 44, 46 between the first side 30 and the second side 32 to allow the handling unit 210 to remove or place workpieces on the second side 32.

The handling unit 210 is exemplarily configured as a robot 212, for instance as an industrial robot, articulated arm robot or the like. In the exemplary embodiment, the handling unit 210 comprises various members that are movable (for instance pivotable) relative to each other. In the exemplary embodiment, the handling unit 210 is mounted on the base 12. The handling unit 210 comprises a workpiece gripper 214 that can reach an upper loading aid 40, 42, 44, 46 of a stack of loading aids 40, 42, 44, 46 on the second side 32 and grip or deposit workpieces there.

In FIG. 6, the hanging carrier 120 of the transfer unit 110 is positioned at the second side 32 to pick up or deliver a loading aid 40, 42, 44, 46 there. In FIG. 7, the hanging carrier 120 of the transfer unit 110 is positioned at the first side 30 in order to pick up or deliver a loading aid 40, 42, 44, 46 there. In the exemplary embodiment, the transfer unit 110 is substantially limited to horizontal movements of the hanging carrier 120. FIG. 7 illustrates how the locking mechanism 122 can engage a loading aid 40, 42, 44, 46 to lift the loading aid 40, 42, 44, 46 and secure it to the hanging carrier 120.

The provision of the loading aids 40, 42, 44, 46 (of the respective upper loading aid 40, 42, 44, 46 of the stack) by the support segment 64 is effected by a lifting movement of the support segment 64, compare the double arrow 220 in FIG. 7. Similarly, the delivery of the loading aids 40, 42, 44, 46 can be effected by a lifting movement of the lifting console 66, compare the arrow 222 in FIG. 7. The lifting movements 220, 222 of the support segment 64 and the lifting console 66 are mechanically force-coupled in the exemplary embodiment. A coupling member 90 is provided to couple the support segment 64 and the lifting console 66 (indicated only by dashed lines in FIGS. 6 and 7). The lifting console 66 is lowered by the same amount as the support segment 64 is raised, and vice versa.

The transfer unit 110 can move the hanging carrier 120 horizontally, compare arrow 224. Since in the exemplary embodiment the hanging carrier 120 of the transfer unit 110 cannot be moved vertically, lifting movements 220, 222 of support segment 64 and/or lifting console 66 are also required during direct transfer with the hanging carrier 120. The lifting movements 220, 222 are generated by a single vertical drive 74 (FIG. 1 and FIG. 2).

Figure 8:
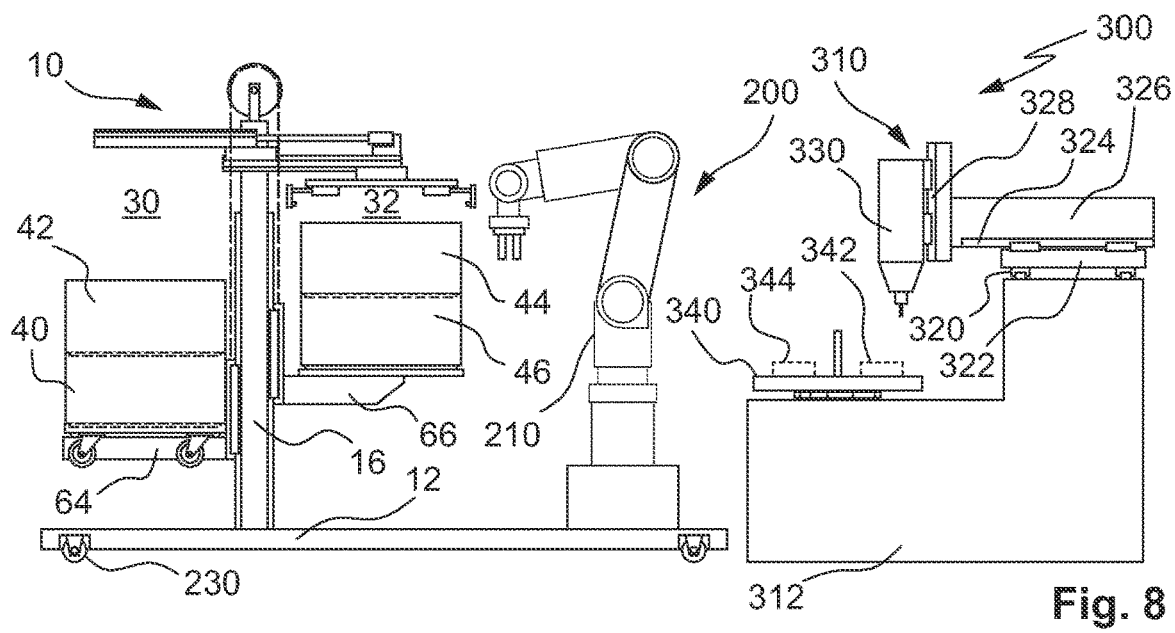
FIG. 8: is a schematic side view of an embodiment of a manufacturing system.

FIG. 8 illustrates a manufacturing system that is designated by 300. The manufacturing system 300 includes a machine tool 310 and an automation module 200 coupled to the machine tool 310. In the exemplary embodiment, the automation module 200 comprises a handling unit 210 and a stacking device 10. In the exemplary embodiment, the base 12 of the stacking device 10 is configured to be movable and is provided with a carriage 230. In this way, the automation module 200 can be coupled to the machine tool 310 as needed to automate the loading process.

The machine tool 310 includes a bed 312 that supports a horizontal guide 320 that supports a slide 322 that supports a horizontal guide 324. The horizontal guides 320 and 324 are oriented perpendicular to each other. The horizontal guide 324 is associated with another slide 326 that supports a vertical guide 328. A tool spindle 330 is received on the vertical guide 328 to be vertically movable. The tool spindle 330 is configured to receive a machining tool. The tool spindle 330 is movable in three axes relative to a workpiece table 340 via the guides 320, 324, 328. In the exemplary embodiment, the workpiece table 340 is configured to receive workpieces 342, 344. For example, the workpiece table 340 includes locations for two workpieces 342, 344, wherein the workpiece table 340 is rotatable such that one workpiece 342, 344 is in a supply position and another is in a machining position, respectively. This is not to be understood in a limiting manner.

The handling unit 210 can transfer workpieces 342, 344 between the second side 32 of the stacking device 10 and the machine tool 310. In this way, a partially automated or highly automated loading process can be realized. In this context, in certain embodiments, the stacking device 10 can also serve as a buffer storage. Workpieces 342, 344 in individual form are exchanged between the second side 32 of the stacking device 10 and the machine tool 310. An exchange of workpieces 342, 344 with the environment is carried out in batches using the loading aids 40, 42, 44, 46 via the first side 30 of the stacking device 10.

Figure 9:
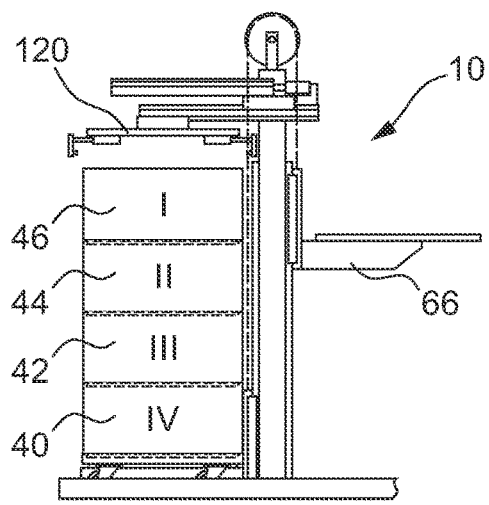
FIGS. 9-12: are several schematic side views of a stacking device illustrating a stacking sequence.
Figure 10:
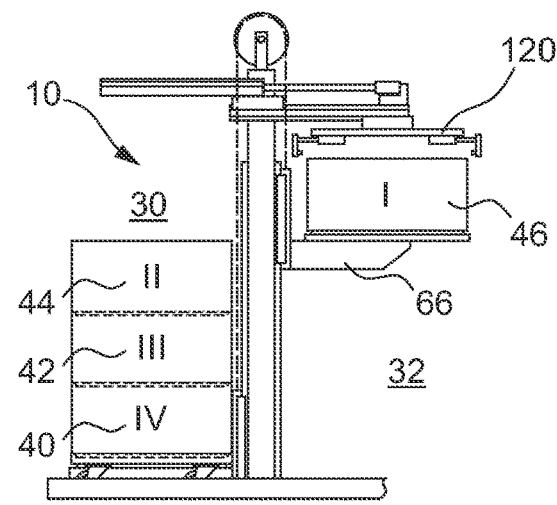
Figure 11:
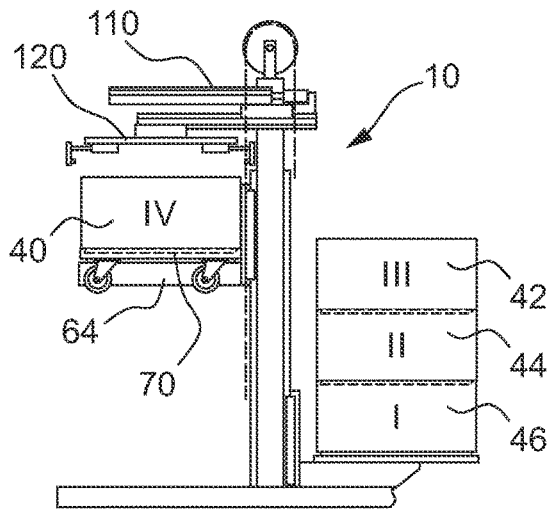

With reference to FIGS. 9-12, an operating mode of the stacking device 10 is illustrated. In FIG. 9, a complete stack of four loading aids 40, 42, 44, 46 (I-IV) is arranged on the first side 30. Using the lifting movements (220, 222 in FIG. 7) as well as the horizontal movement (224 in FIG. 7), the stack is dismantled step by step, wherein individual loading aids 40, 42, 44, 46 are taken over by the hanging carrier 120 of the transfer unit 110 and transferred from the first side 30 to the second side 32 (compare FIG. 10 and FIG. 11). Step by step, the support segment 64 on the first side 30 is lifted to feed the remaining loading aids 40, 42, 44, 46 (I-IV) to the transfer unit 110. Due to the coupled movement, the lifting console 66 on the second side 32 is gradually lowered. In this way, sufficient space is available on the second side 32 to accommodate the loading aids 40, 42, 44, 46 (I-IV).

The loading aid (compare designation I in FIGS. 9-12), which is arranged at the top of the stack on the support segment 64 on the first side 30, is transferred first and is consequently at the bottom of the stack on the lifting console 66 on the second side 62. The sequence (top-bottom) consequently changes during the transfer between the first side 30 and the second side 32. This can be used in such a way that, for example, when a stack of loading aids 40, 42, 44, 46 with new workpieces to be processed is provided at the first side 30, the stack is first completely transferred to the second side 32. There, starting from the upper loading aid 40, 42, 44, 46 (in FIG. 12 IV), workpieces are then separated and removed by the handling unit 210 and supplied for processing in the machine tool 310.

In this way, the upper loading aid 40, 42, 44, 46 of a stack can be gradually emptied. It is also conceivable to replace unprocessed workpieces with processed workpieces. When the upper loading aid 40, 42, 44, 46 on the second side 32 has been completely worked off, a return towards the first side 30 to the support segment 64 can take place. The loading aid 40, 42, 44, 46 can be placed there on the conveyor 70. In this way, the stack of loading aids 40, 42, 44, 46 on the second side 32 can be processed piece by piece.

In the exemplary embodiment, the lifting movement of the support segment 64 and lifting console 66 has a reverse step characteristic. FIG. 13 illustrates an exemplary pilgrim step characteristic in connection with FIGS. 6, 7 and 9-12. It has been indicated further above that, in certain embodiments, the transfer unit 110 with the hanging carrier 120 can be moved exclusively horizontally. Accordingly, both a supply (feeding) and lifting movements for transferring or taking over loading aids 40, 42, 44, 46 are performed by vertical movements of support segment 64 and lifting console 66. Due to the forced coupling, a symmetrical design results.

FIG. 13 shows a diagram. The abscissa 240 describes the time. The ordinate 242 describes a respective vertical position (lift position). The diagram is divided into segments I-IV. The segments I-IV each refer to the handling of one of the loading aids 40, 42, 44, 46 marked I-IV in FIGS. 9-12. A curve 250 describes the current lifting position of the support segment 64. A mirror-inverted curve 252 describes the associated lifting position of the lifting console 66. The reference sign 254 designates an initial position of the support segment 64. The reference sign 256 designates an initial position of the lifting console 66, compare FIG. 9.

The movements of the support segment 64 and the lifting console 66 in the segments I-IV are each characteristic and mirror-inverted to each other. By way of example, with reference to segment IV, the transfer of the lower loading aid 40 on the conveyor 70 at the support segment 64 is described, compare FIGS. 11 and 12. Starting from the lifting position previously assumed in segment III, the support segment 64 is raised further when the corresponding loading aid 42 (III) has been delivered to the second side 32. The reference sign 260 describes a lift, at which the loading aid 40 has moved so far towards the hanging carrier 120 of the transfer unit 110 that a takeover by the hanging carrier 120 is possible. However, since the loading aids 40, 42, 44, 46 in the exemplary embodiment are nested with each other and, if necessary, with the conveyor 70, a slight lowering of the support segment 64 is required starting from this extreme lifting position (transfer stroke 260). The transfer stroke 260 is reflected in a counter stroke 262 on the side of the lifting console 66.

After the support segment 64 has been set back (lowered), sufficient space is available for the transfer unit 110 with the hanging carrier 120 to move the loading aid 40 (I) horizontally from the first side 30 to the second side 32. If the loading aid 40 (I) were to be detached from the hanging carrier 120 there without further measures, the loading aid 40 (I) would fall down a bit. Therefore, the lifting console 66 is now raised a little (takeover lift 266) so that the loading aid 40 (I) can be placed seamlessly on the waiting stack of loading aids 42, 44, 46 (II-IV). The takeover stroke 266 on the side of the lifting console 66 is mirrored by a counter-stroke 264 on the side of the support segment 64. Finally, in order for the transfer unit 110 with the hanging carrier 120 to be released and moved back to the first side 30, the lifting console 66 is again lowered slightly. This results in an overall pilgrim step characteristic. The basically continuous lifting movement (without change of sign at the slope) is interrupted at least briefly by a lifting movement in the opposite direction (brief change in the sign of the slope).

Figure 12:
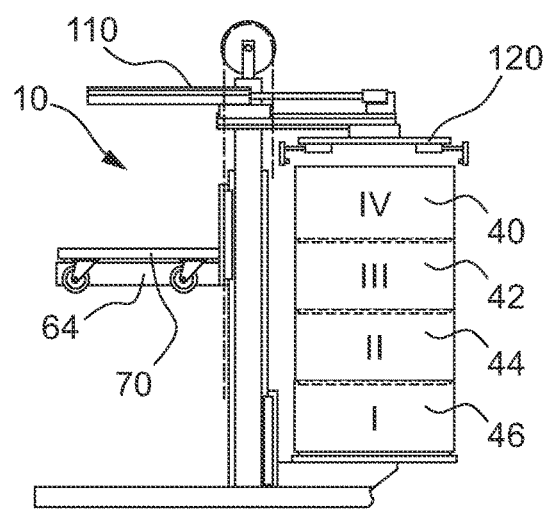
Figure 13:
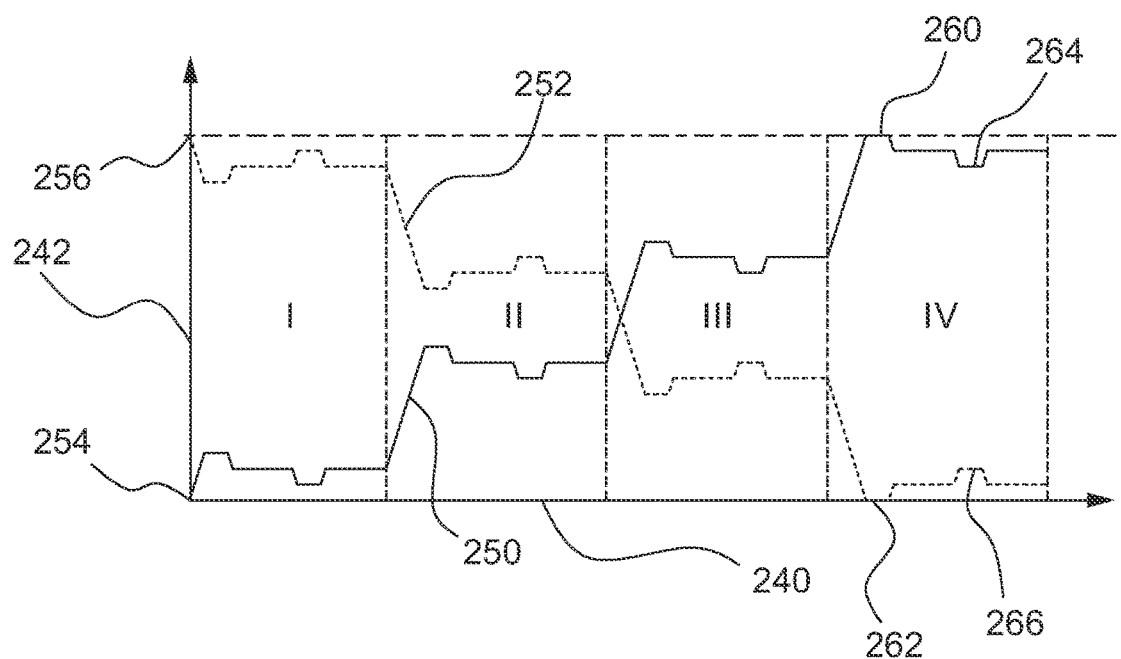
FIG. 13: is a diagram illustrating a coupled lifting motion with pilgrim step characteristics in one embodiment of a stacking device.
Figure 14:
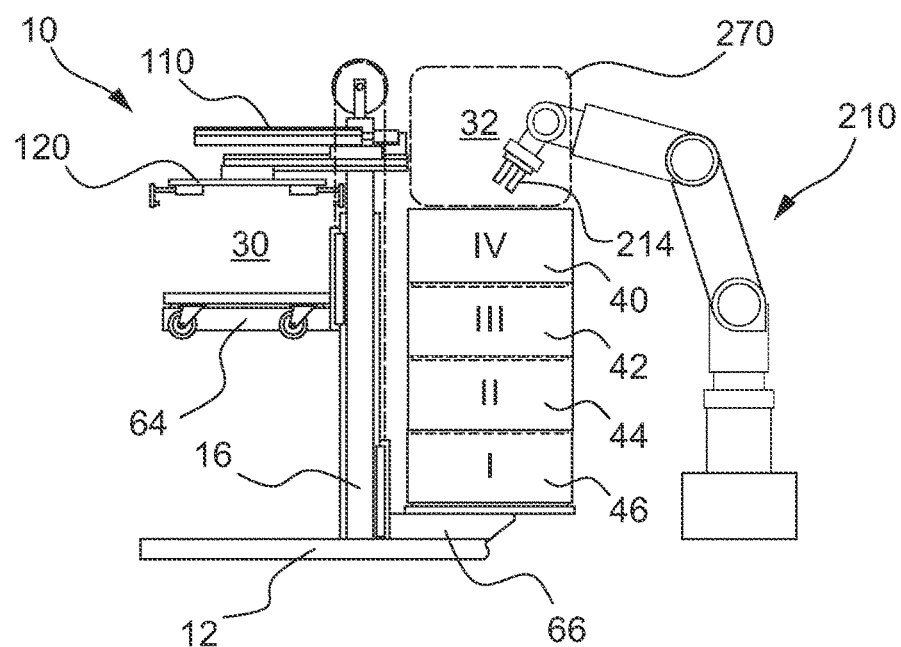
FIG. 14: is a further simplified side view of a stacking device with associated handling unit to illustrate an access area for the handling unit.

FIG. 14 is based on FIG. 12 and illustrates a free space 270 above the stack of loading aids 40, 42, 44, 46 that results when the transfer unit 110 with the hanging carrier 120 has been moved back to the first side 30. The top of the stack of loading aids 40, 42, 44, 46 is readily accessible to the handling unit 210 so that the gripper 214 can remove or deposit workpieces. The free space 270 also results from the telescoping capability of the transfer unit 110, which in the exemplary embodiment is arranged completely or almost completely on the first side 30 in the retracted state of the horizontal drive 112.

Figure 15:
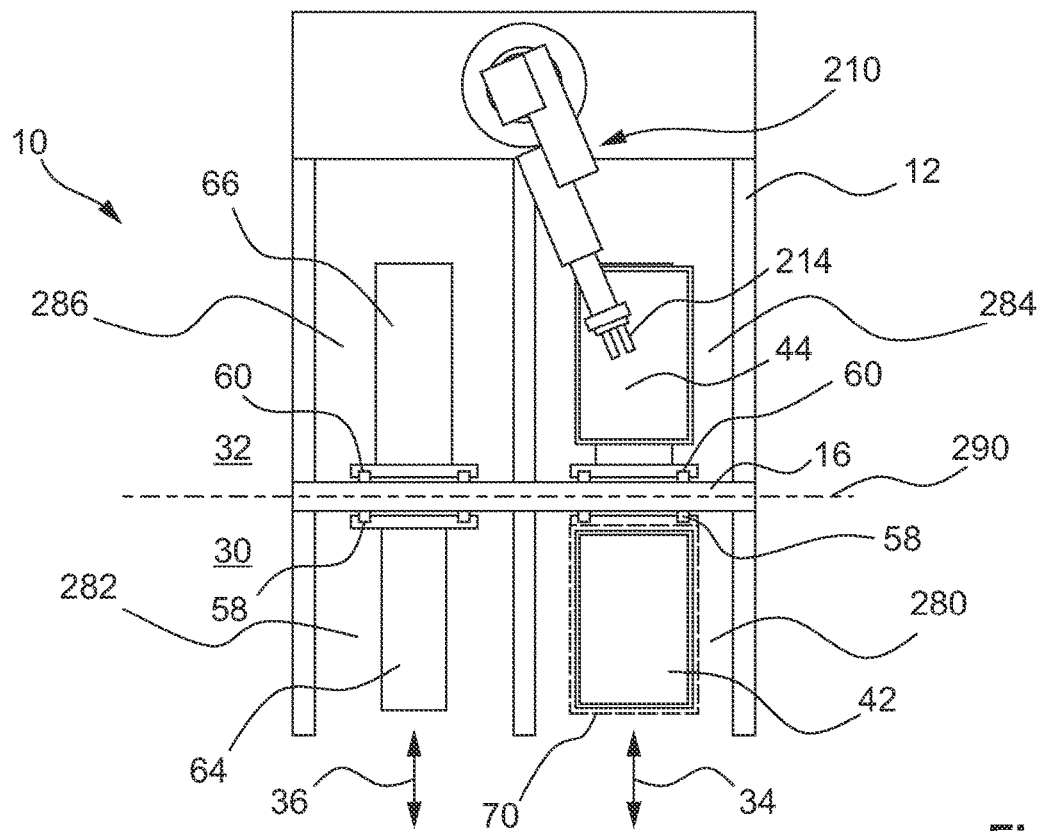
FIG. 15: is a simplified schematic top view of a stacking device with two parallel conveyor paths, to which a handling unit is assigned.

With reference to FIG. 15, a two-channel embodiment is illustrated by means of a top view of a stacking device 10 with an associated handling unit 210. Compare FIG. 1. The stacking device 10 has a first conveying path 34 and a second conveying path 36, which in the exemplary embodiment are functionally and spatially oriented parallel to each other. Each of the conveying paths 34, 36 extends between the first side 30 and the second side 32. The first conveying path 34 comprises a pickup location 280 on the first side 30. The second conveying path 36 comprises a pick-up location 282 on the first side 30. A conveyor 70 with loading aids 40, 42, 44, 46 picked up thereon can be fed to each of the pickup locations 280, 282 and picked up there on a support segment 64 and lifted as required. This can take place independently of one another at the pickup locations 280, 282.

The first conveyor path 34 includes a supply location 284 on the second side 32. The second conveyor path 36 includes a supply location 286 on the second side 32, where in each case a vertically movable lifting console 66 is provided, which is configured to receive a stack of loading aids 40, 42, 44, 46. The loading aids 40, 42, 44, 46 can be transferred within a conveyor path 34, 36 between the first side 30 and the second side 32. In the exemplary embodiment, no transfer of a loading aid 40, 42, 44, 46 between the conveying paths 34, 36 is possible. The stud frame 16 defines a separation plane 290 between the first side 30 and the second side 32.

The use of two conveyor paths 34, 36, each with a pick-up location 280, 282 and a supply location 284, 286, increases the flexibility, redundancy and performance of the stacking device 10. Further applications can be covered in this way. Exemplarily, one of the two conveyor paths 34, 36 serves to supply unprocessed workpieces, with the other of the two conveyor paths 34, 36 serving to discharge processed workpieces. This is not to be understood to be limiting. It is also conceivable that both unprocessed and processed workpieces are fed back and forth along one and the same conveyor path 34, 36. In the exemplary embodiment, both conveying paths 34, 36, and for instance both supply locations 284, 286 on the second side 32 are served by one and the same handling unit 210. This is not to be understood to be limiting.

Figure 16:
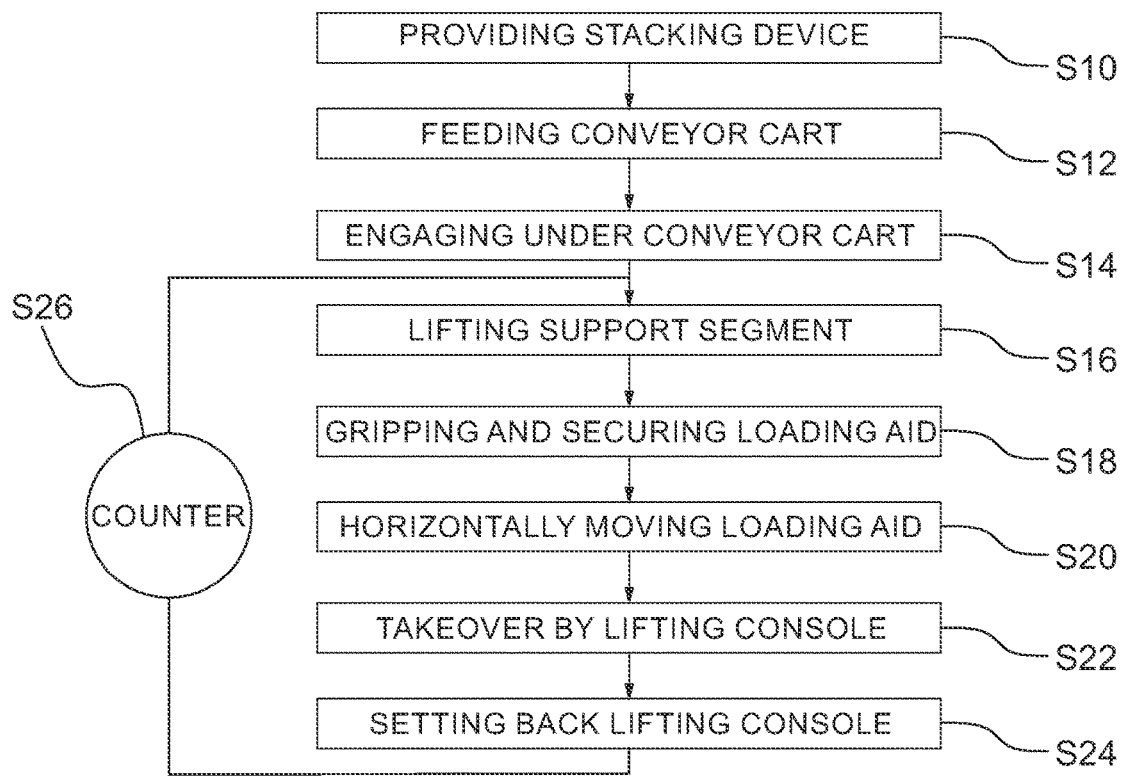
FIG. 16: is a block diagram illustrating an embodiment of a method for feeding a machine tool.

With reference to FIG. 16, a block diagram is used to illustrate an embodiment of a method for feeding a machine tool with workpieces. A first step S10 comprises providing a stacking device according to at least one of the embodiments described herein. By way of example, the stacking device has a vertically movable support segment for receiving a conveyor with a plurality of loading aids, which is in a forced coupling with a vertically movable lifting console for receiving a stack of loading aids.

A further step S12 comprises feeding a conveyor with a stack of loading aids. The conveyor can be driven or non-driven. As an example, the conveyor is fed to a pick-up location on a first side of the stacking device and placed there above a support segment. This can be followed by a step S14, which comprises engaging under the conveyor with the loading aids arranged thereon by the support segment.

In a further step S16, the support segment together with any loading aids arranged on it is lifted in order to feed an upper loading aid to a transfer unit, for instance to a hanging carrier there. This lifting movement results in a forced-coupling vertical movement of a lifting console on the opposite, second side of the stacking device. When the upper loading aid is positioned close enough to the hanging carrier, the loading aid can be gripped and secured by the hanging carrier in a step S18, for example using a locking mechanism at the hanging carrier that engages the loading aid in a form-fit and/or friction-locked manner. Thereafter, the support segment can be moved back slightly downwards to release the upper loading aid.

In a subsequent step S20, the loading aid held by the hanging carrier is moved horizontally from the first side to the second side by the transfer unit. Due to the coupled lifting movement, the lifting console is already in a favorable starting position for taking over the loading aid. A step S22 can follow, which comprises a takeover stroke of the lifting console in the direction of the loading aid on the hanging carrier, in order to be able to take over the loading aid seamlessly from the hanging carrier. The takeover by the lifting console takes place in a step S24, which may comprise a limited setting back of the lifting console to allow the hanging carrier of the transfer unit to return from the second side to the first side.

In the exemplary embodiment, a counter (reference character S26) is provided to ensure that steps S16-S24 are run through several times, corresponding to the number of loading aids to be transferred between the first side and the second side. Finally, in the exemplary embodiment, all loading aids that are provided via the conveyor on the first side are transferred to the second side. There, with the help of a handling unit, a separation and a transfer between the second side and a machine tool can follow. If the processed workpieces are transferred to the loading aids again after processing, the process can be run backwards, at least in sections, to transfer the loading aids from the second side back to the first side and deposit them there on the conveyor. A similar process can be carried out if processed workpieces are unloaded elsewhere and empty loading aids are transferred back to the first side instead.

What is claimed is:

1. A stacking device for handling loading aids for an automated feeding of a machine tool, comprising:
   a base,
   a first side having a first vertical guide,
   a second side having a second vertical guide,
   a stud frame supported by the base,
   a vertically movable support segment that is moveable along the first vertical guide,
   a vertically movable lifting console that is moveable along the second vertical guide, and
   a transfer unit that is configured to transfer the loading aids piecewise between the first side and the second side, wherein the transfer unit comprises a horizontal drive that is located substantially on the first side, at least in a state when the horizontal drive has approached the first side, wherein the transfer unit is positioned in a first position on the first side in such a way that a loading aid that is supported on the second side by the lifting console is freely accessible from above for a handling unit that is arranged to transfer work-pieces between the loading aid provided by the stacking device on the second side and a machine tool,
wherein the first vertical guide and the second vertical guide are mounted at the stud frame,
wherein the support segment is disposed on the first side and configured for receiving a conveyor that carries two or more loading aids that are arranged one above the other,
wherein the support segment and the lifting console are arranged facing away from each other at the stud frame,
wherein the support segment and the lifting console are coupled to one another in a forced coupling via a common coupling member, and are together vertically movable at the stud frame in opposite directions via a common vertical drive, and
wherein the lifting console is disposed on the second side and configured for receiving one or more loading aids and for supporting two or more loading aids that are arranged one above the other.

2. The stacking device of claim 1,
wherein the support segment and the lifting console are vertically movable with a pilgrim step characteristic during a piecewise transfer of a stack of loading aids between the first side and the second side, and
wherein the transfer of a loading aid between the first side and the second side is performed by a horizontal movement.

3. The stacking device of claim 1,
wherein the coupling member is configured as a traction means.

4. The stacking device of claim 1,
wherein the common vertical movements of the support segment and the lifting console each comprise a stroke of the same absolute value.

5. The stacking device of claim 1,
wherein the support segment is configured to engage under and lift the conveyor that is rollable and configured to receive a stack of the two or more loading aids arranged one above the other, and
wherein the lifting console has a support for directly receiving a stack of loading aids.

6. The stacking device of claim 1,
wherein the vertical drive acts on the support segment to move the support segment and mediately the lifting console vertically in mutually opposite directions.

7. The stacking apparatus of claim 1,
wherein at the stud frame a transfer opening is formed, which can be passed by the transfer unit and by a loading aid held be the transfer unit, and
wherein the stud frame separates the first side and the second side from one another.

8. The stacking apparatus of claim 1,
wherein the transfer unit comprises a hanging carrier having a locking mechanism for gripping and holding a loading aid.

9. The stacking device of claim 1,
wherein the vertical drive of the support segment and the lifting console is controlled to approach a desired vertical position with respect to the transfer unit for receiving or delivering a loading aid.

10. The stacking device of claim 1,
wherein on each of the first side and on the second side two locations for receiving a stack of loading aids are formed, and
wherein the two stacks are transferable and moveable independently of one another between the first side and the second side.

11. The stacking device of claim 1,
wherein the transfer unit comprises a horizontally movable horizontal carriage that is horizontally movable in a constant vertical position.

12. The stacking device of claim 1, wherein the transfer unit is horizontally telescopic and comprises a double guide that is movable relative to a guide base and provided with two parallel guide sections, one of which being coupled with the guide base, and another one of which being coupled with the horizontal carriage.

13. A stacking device configured to handle loading aids for an automated feeding of a machine tool, comprising:
a base,
a first side having a first vertical guide,
a second side having a second vertical guide,
a stud frame supported by the base,
a vertically movable support segment that is moveable along the first vertical guide,
a vertically movable lifting console that is moveable along the second vertical guide, and
a transfer unit that is configured to transfer the loading aids piecewise between the first side and the second side, wherein the transfer unit comprises a horizontally movable horizontal carriage that is horizontally movable in a constant vertical position,
wherein the first vertical guide and the second vertical guide are mounted at the stud frame,
wherein the support segment is disposed on the first side and configured for receiving a conveyor that carries two or more loading aids that are arranged one above the other,
wherein the lifting console is disposed on the second side and configured for receiving one or more loading aids and for supporting two or more loading aids that are arranged one above the other,
wherein the support segment and the lifting console are arranged facing away from each other at the stud frame,
wherein the support segment and the lifting console are coupled to one another in a forced coupling via a common coupling member, and are together vertically movable at the stud frame in opposite directions via a common vertical drive, and
wherein the transfer unit is horizontally telescopic and comprises a double guide that is movable relative to a guide base and provided with two parallel guide sections, one of which being coupled with the guide base, and another one of which being coupled with the horizontal carriage.

14. The stacking apparatus of claim 13,
wherein the horizontal carriage, the guide base and the double guide are coupled to each other via a traction means such that when the double guide is moved relative to the guide base, the horizontal carriage is inevitably moved relative to the double guide.

15. The stacking device of claim 13,
wherein the support segment and the lifting console are vertically movable with a pilgrim step characteristic during a piecewise transfer of a stack of loading aids between the first side and the second side, and
wherein the transfer of a loading aid between the first side and the second side is performed by a horizontal movement.

16. The stacking device of claim 13,
wherein the coupling member is configured as a traction means.

17. The stacking device of claim 13,
wherein the common vertical movements of the support segment and the lifting console each comprise a stroke of the same absolute value.

18. The stacking device of claim 13,
wherein the support segment is configured to engage under and lift the conveyor that is rollable and configured to receive a stack of the two or more loading aids arranged one above the other, and
wherein the lifting console has a support for directly receiving a stack of loading aids.

19. The stacking device of claim 13,
wherein the vertical drive acts on the support segment to move the support segment and mediately the lifting console vertically in mutually opposite directions.

20. The stacking apparatus of claim 13,
wherein at the stud frame a transfer opening is formed, which can be passed by the transfer unit and by a loading aid held be the transfer unit, and
wherein the stud frame separates the first side and the second side from one another.

21. The stacking apparatus of claim 13,
wherein the transfer unit comprises a hanging carrier having a locking mechanism for gripping and holding a loading aid.

22. The stacking device of claim 13,
wherein the vertical drive of the support segment and the lifting console is controlled to approach a desired vertical position with respect to the transfer unit for receiving or delivering a loading aid.

23. The stacking apparatus of claim 13,
wherein the transfer unit comprises a horizontal drive that is located substantially on the first side, at least in a state when the horizontal drive has approached the first side.

24. The stacking device of claim 23,
wherein the transfer unit is positioned in a first position on the first side in such a way that a loading aid that is supported on the second side by the lifting console is freely accessible from above for a handling unit that is arranged to transfer workpieces between the loading aid provided by the stacking device on the second side and a machine tool.

25. The stacking device of claim 13,
wherein on each of the first side and on the second side two locations for receiving a stack of loading aids are formed, and
wherein the two stacks are transferable and moveable independently of one another between the first side and the second side.

* * * * *